United States Patent [19]
Cochran

[11] 3,976,975
[45] Aug. 24, 1976

[54] PROMPTING CALCULATOR

[75] Inventor: Michael J. Cochran, Richardson, Tex.

[73] Assignee: Texas Instruments Incorporated, Dallas, Tex.

[22] Filed: Feb. 4, 1974

[21] Appl. No.: 439,473

[52] U.S. Cl. .............................. 340/172.5; 35/8 R; 35/9 A; 235/152
[51] Int. Cl.² .................... G06F 15/02; G06F 9/06; G06F 3/14
[58] Field of Search .................. 340/172 S, 324 M; 35/8 R, 9 R, 9 A, 6; 235/152, 156

[56] References Cited
UNITED STATES PATENTS

| | | | |
|---|---|---|---|
| 3,281,959 | 11/1966 | Kobler | 35/6 |
| 3,308,439 | 3/1967 | Tink | 340/172.5 |
| 3,533,076 | 10/1970 | Perkins | 340/172.5 |
| 3,533,078 | 10/1970 | Perkins | 340/172.5 |
| 3,575,589 | 4/1971 | Neema | 340/172.5 |
| 3,596,256 | 7/1971 | Alpert | 340/172.5 |
| 3,686,637 | 8/1972 | Zachar | 340/172.5 |
| 3,701,975 | 10/1972 | McBride | 340/172.5 |
| 3,702,988 | 11/1972 | Haney | 340/172.5 |
| 3,768,078 | 10/1973 | Williams | 340/172.5 |
| 3,781,852 | 12/1973 | White | 340/172.5 |
| 3,821,535 | 6/1974 | Nagakura | 340/324 M |

*Primary Examiner*—Gareth D. Shaw
*Assistant Examiner*—James D. Thomas
*Attorney, Agent, or Firm*—Harold Levine; Stephen S. Sadacca

[57] ABSTRACT

Disclosed is a self-contained data processing unit, preferably a calculator, which includes an output indicator directing the user which data or function entry the system next expects. After initial data and function entries, a permanent store memory generates successive coded representations of the next entry expected. These representations are visually indicated to the user by an output indicator such as a printer, light emitting diodes, or gas discharge tubes allowing the user to input in proper sequence a long series of inputs without referring to a user's guide.

10 Claims, 22 Drawing Figures

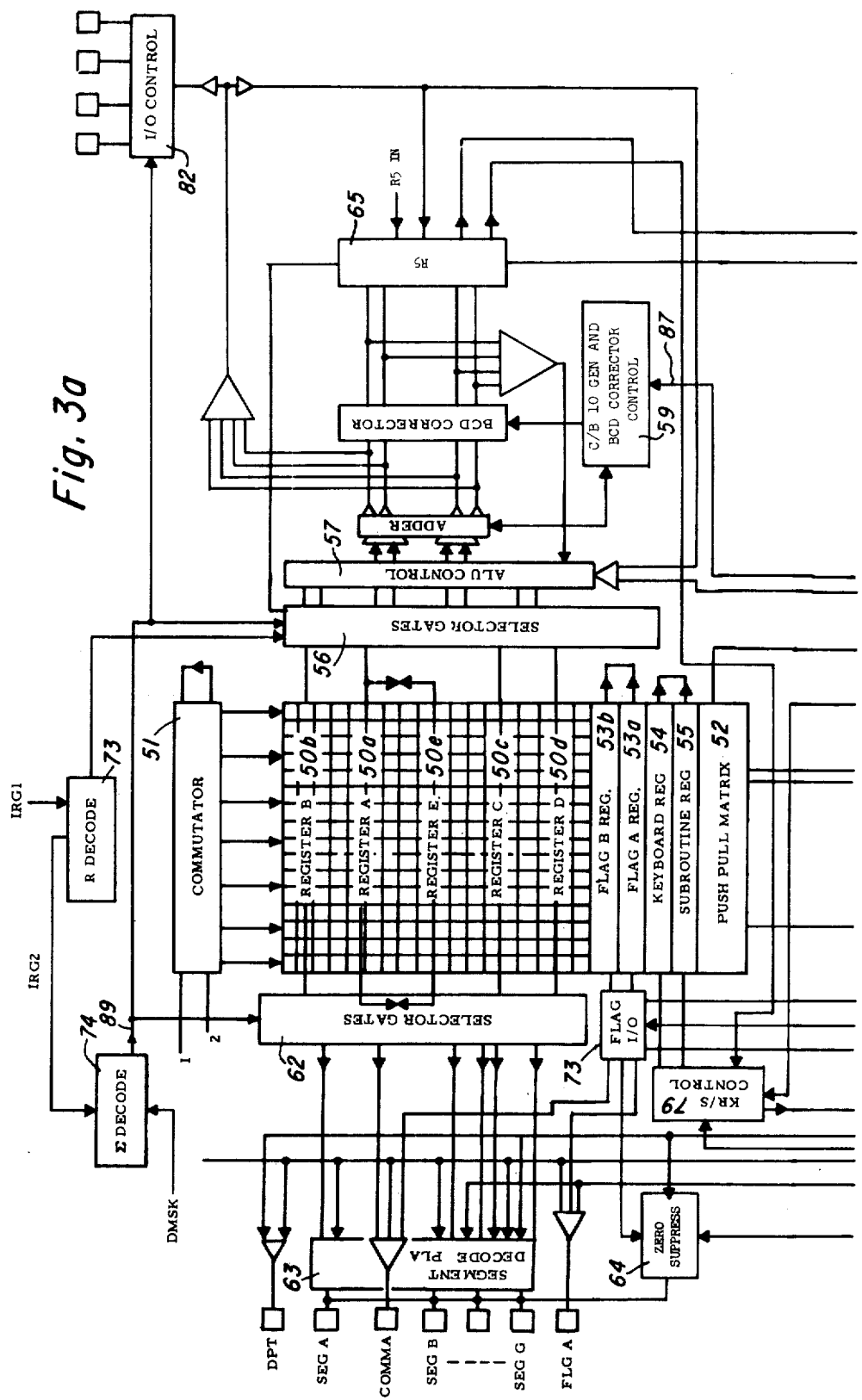

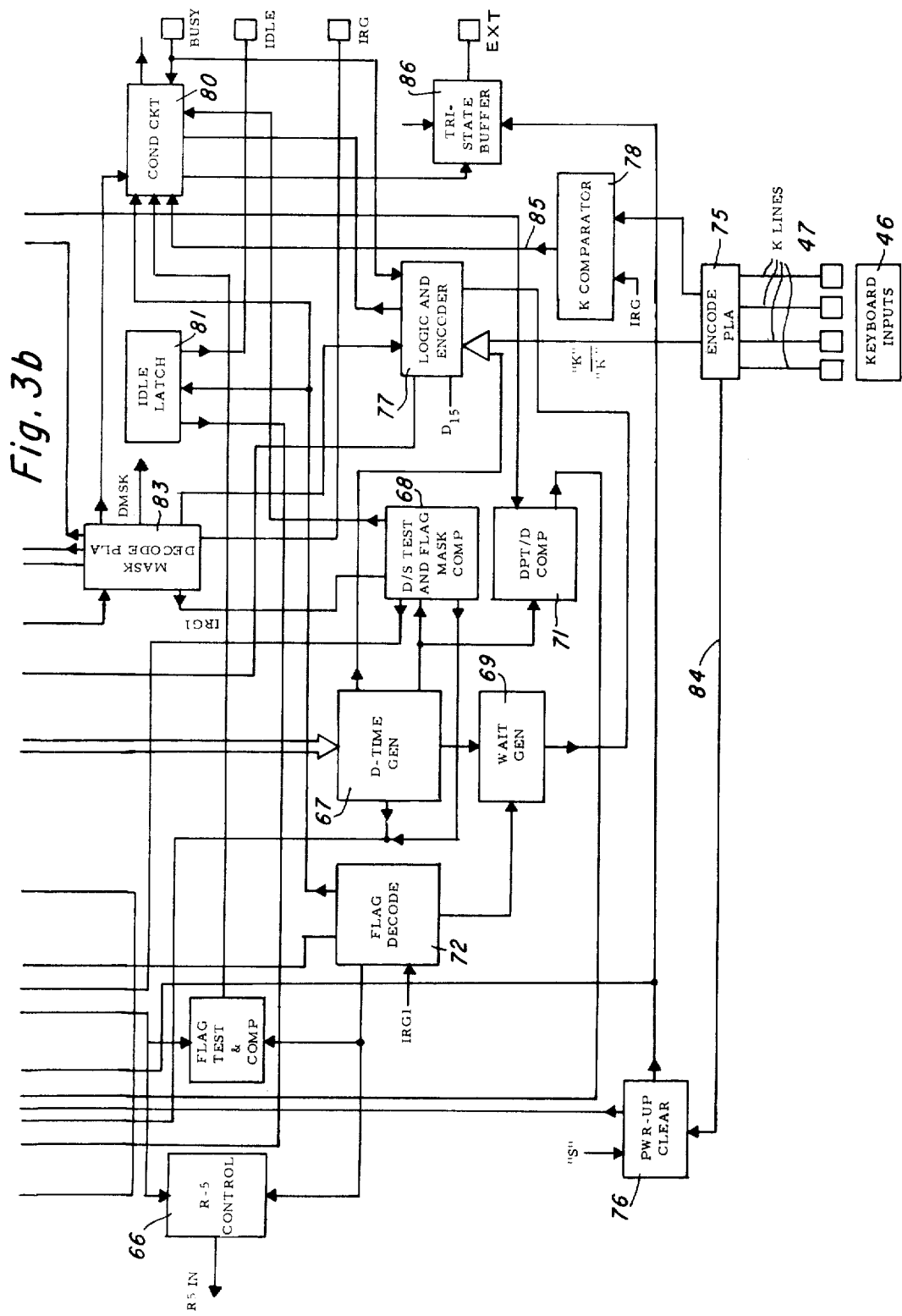

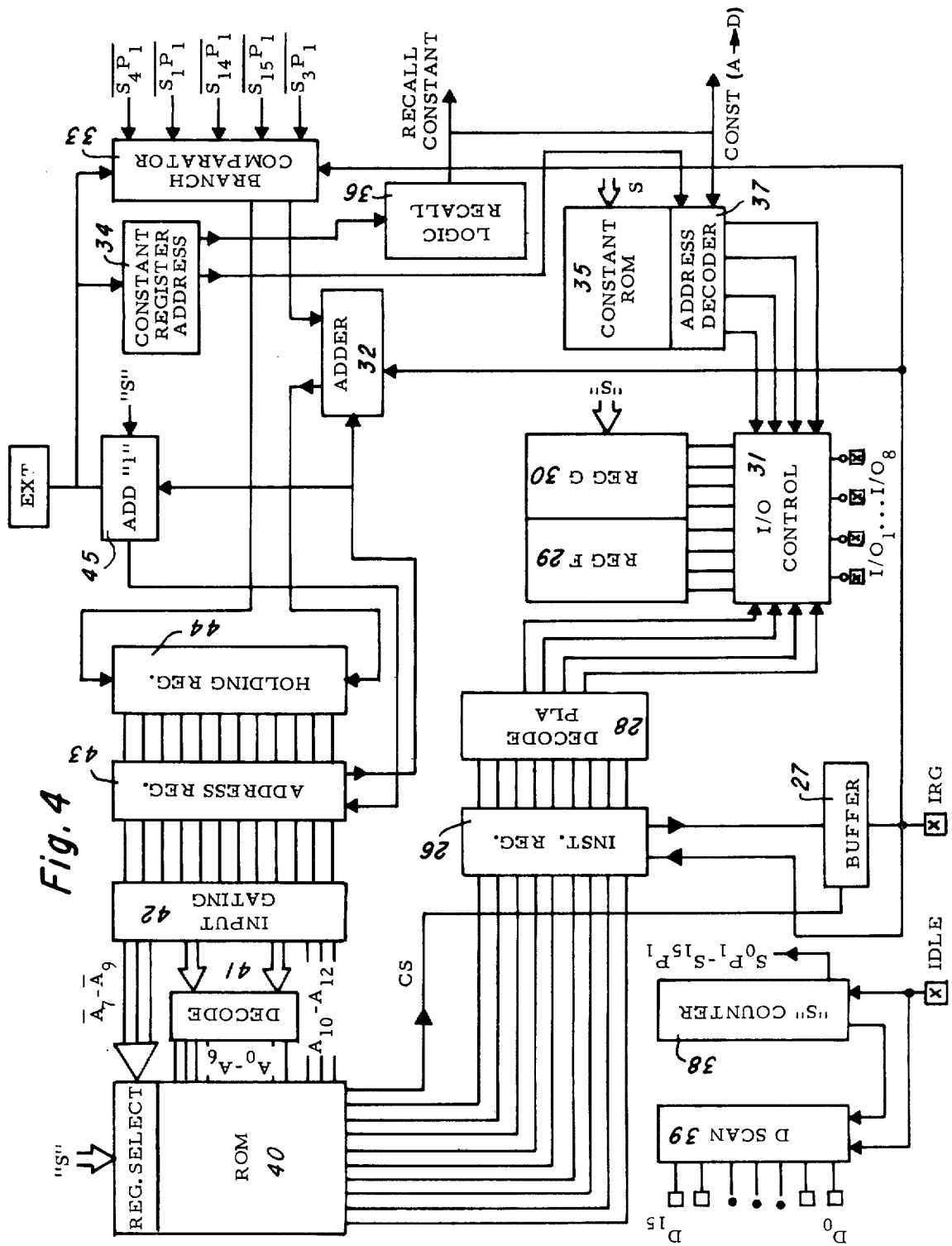

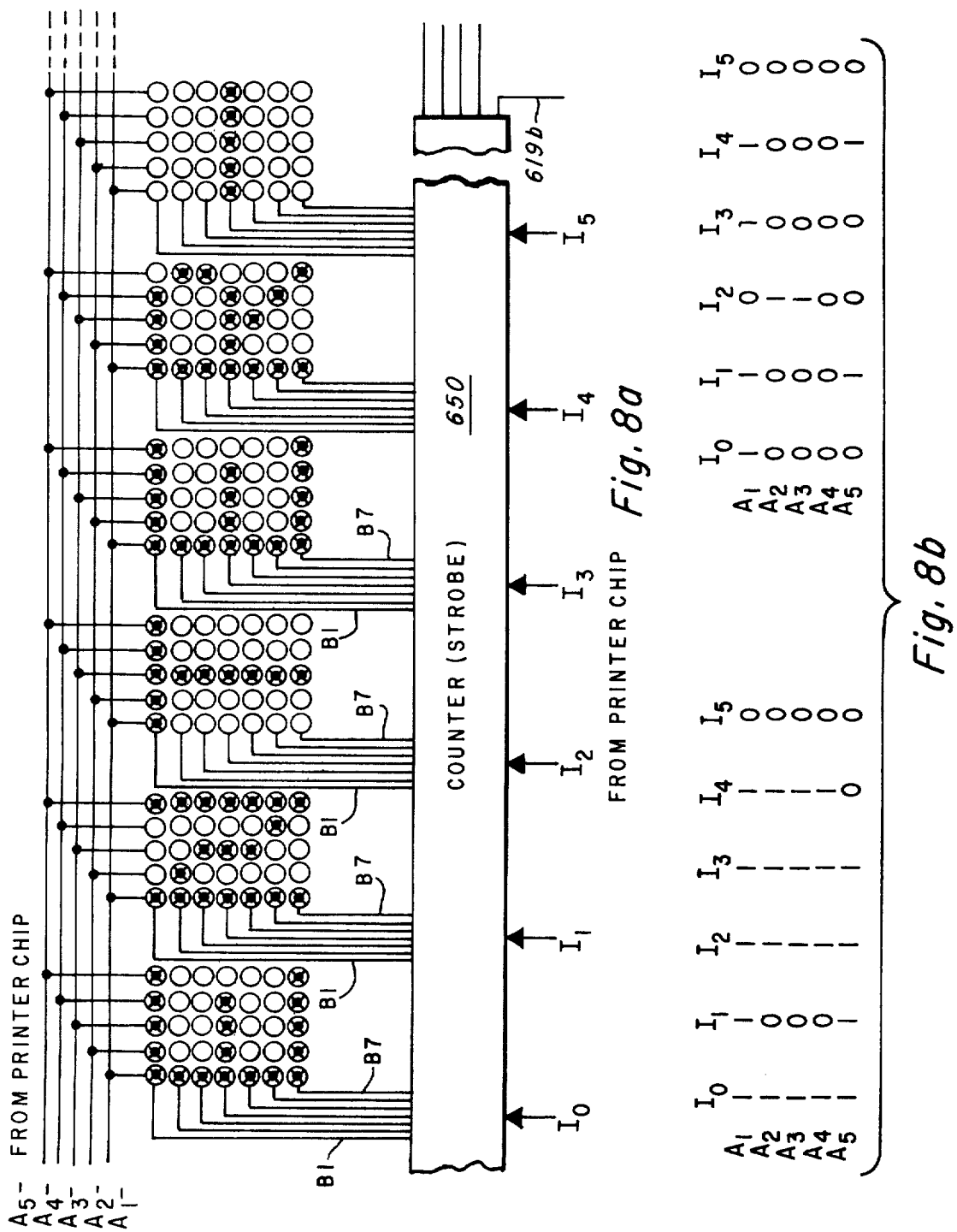

The following 8 bits effective only if flag operations

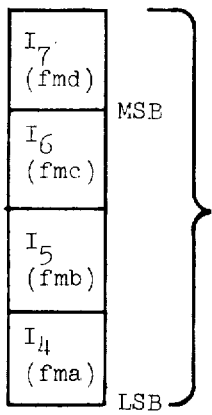

Generate FlagMask when these 4 bits equal the 4 encoded state bits.
(NOTE: ENCODED STATE TIMES ARE +2 FROM ACTUAL STATES)

The following 8 bits effective only if Keyboard operations

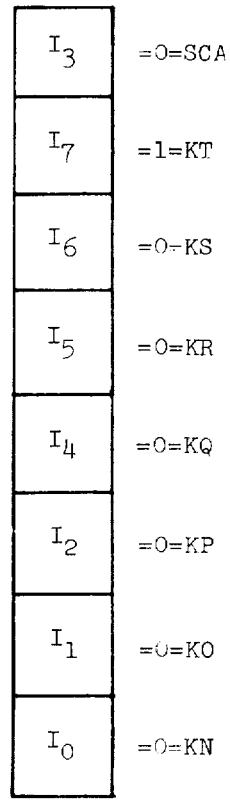

$I_3$ =0=SCAN KYBD
$I_7$ =1=KT
$I_6$ =0=KS
$I_5$ =0=KR
$I_4$ =0=KQ
$I_2$ =0=KP
$I_1$ =0=KO
$I_0$ =0=KN

*Fig. 11d*

The following 4 bits (flagops) effective only during flagmask except $f_{14}$ & $f_{15}$

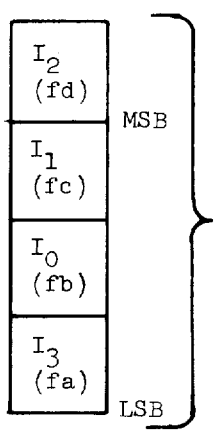

$f_0$ = TEST FLAG A
$f_1$ = TEST FLAG B
$f_2$ = SET FLAG A
$f_3$ = SET FLAG B
$f_4$ = ZERO FLAG A
$f_5$ = ZERO FLAG B
$f_6$ = INVERT FLAG A
$f_7$ = INVERT FLAG B
$f_8$ = EXCH. FLAG A B
$f_9$ = COMPARE FLAG A B
$f_{10}$ = SET FLAG KR
$f_{11}$ = ZERO FLAG KR
$f_{12}$ = COPY FLAG B→A
$f_{13}$ = COPY FLAG A→B
$f_{14}$ = REG 5→FLAG A S0 S3
$f_{15}$ = REG 5→FLAG B S0 S3

*Fig. 11c*

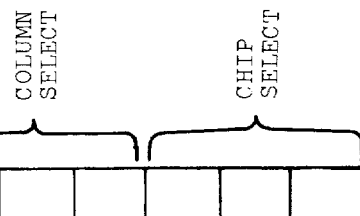

PROMPTING CALCULATOR

This invention relates to self-contained data processing units in general, and more specifically to calculators of a type hich visually prompts the user as to the next keyboard input expected by the calculator system.

BACKGROUND OF THE INVENTION

Calculators have rapidly evolved from relatively simple systems providing the basic four functions of addition, subtraction, multiplication and division into complex systems capable of providing trigonometric, logarithmic, exponential, and diverse other functions. Early calculator systems were implemented using a multiplicity of discrete integrated circuit packages. Later versions were more generally implemented in large scale integrated circuits until systems, such as disclosed in copending patent application, "Variable Function Calculator," Ser. No. 163,565, filed July 19, 1971 now abandoned and replaced by continuation application Ser. No. 420,999, filed Dec. 3, 1973, were implemented having all of the electronics on a single LSI chip. Thereafter, complexity increased and a plurality of LSI chips were utilized in systems, such as set forth in "Electronic Calculator," Ser. No. 255,856, filed May 22, 1972 now abandoned and replaced by continuation application Ser. No. 360,984, filed May 16, 1973, and its continuation-in-part, Ser. No. 360,984, filed May 16, 1973 and by continuation application Ser. No. 444,226, filed Feb. 20, 1974. Even more sophisticated systems were developed employing a plurality of large scale integrated circuit chips which efficiently allowed expanded data memory and program memory storage which allowed even the most sophisticated functions to be provided in a hand-held calculator, such as described in detail in copending patent application, "Multi-Chip Calculator System, " Ser. No. 397,060, filed Sept. 13, 1973, and U.S. Pat. No. 3,904,863, both assigned to the assignee of this application.

Because of this evolution into sophisticated and complex machines, the operating instructions for these calculators have generally also become correspondingly sophisticated and complex. That is, the user of such a complex calculator generally must either frequently refer to an operating instructions guide which recites the particular sequence of inputs required by the system, or the user must recall from his own memory the particular list before the calculator can be utilized to its fullest. The typical business man, engineer and scientist who utilize these machines have neither the time to commit the variety of input operations to memory nor the time and patience to continuously refer to a guide which they would have to carry along with the calculator.

Accordingly, it is an object of the present invention to provide a self-contained data processing system having the capacity to indicate to the user thereof which input by the user is next expected by the data processing system. It is another object of the present invention to provide a calculator system having a keyboard input and an output such that the output provides an indication to the user what keyboard input is next expected by the system. Still another object of the present invention is to provide in a calculator system a keyboard input and a display output including a printer and/or a light emitting or light reflecting display in combination with an addressable memory which stores a plurality of coded prompting commands which indicate to the user the particular sequence of keyboard inputs required by the calculator system. It is yet another object of the present invention to provide the above prompting calculator system having the addressable memories wherein a permanent store memory is included for storing in binary a large number of program instructions.

Briefly and in accordance with the present invention, a prompting calculator is provided of the desk top variety having an alphanumeric printer and/or an alphanumeric display for indicating to the user thereof the next keyboard input expected by the calculator system. A permanent store program memory provides a large number of program instructions in binary form which, in combination with branching circuitry, effects data entry into the calculator and manipulation thereof or effects an output to be displayed or printed instructing the user as to the next expected input.

More specifically, a multi semiconductor chip calculator system comprises a basic pair of semiconductor chips providing conventional calculator functions, but which are implemented so as to interface with external chips providing increased data word and instruction word storage plug alphanumeric output capability. The increased instruction word storage allows a more sophisticated operating program to be utilized for implementing the prompting sequence.

Other objects and advantages will become apparent upon reading the following detailed description of an illustrative embodiment in conjunction with the drawings wherein:

FIGS. 3a and 3b depict a detailed functional block diagram of the "arithmetic chip" utilized in the diagram of FIG. 2;

FIG. 4 depicts a detailed functional diagram of the "SCOM" chip utilized in the system of FIG. 2;

FIGS. 8a and 8b depict an illustrative display which may be utilized according to this invention;

FIGS. 11a–11g depict exemplary instruction word programming available in the chip set of FIGS. 3 and 4.

Figure 1:
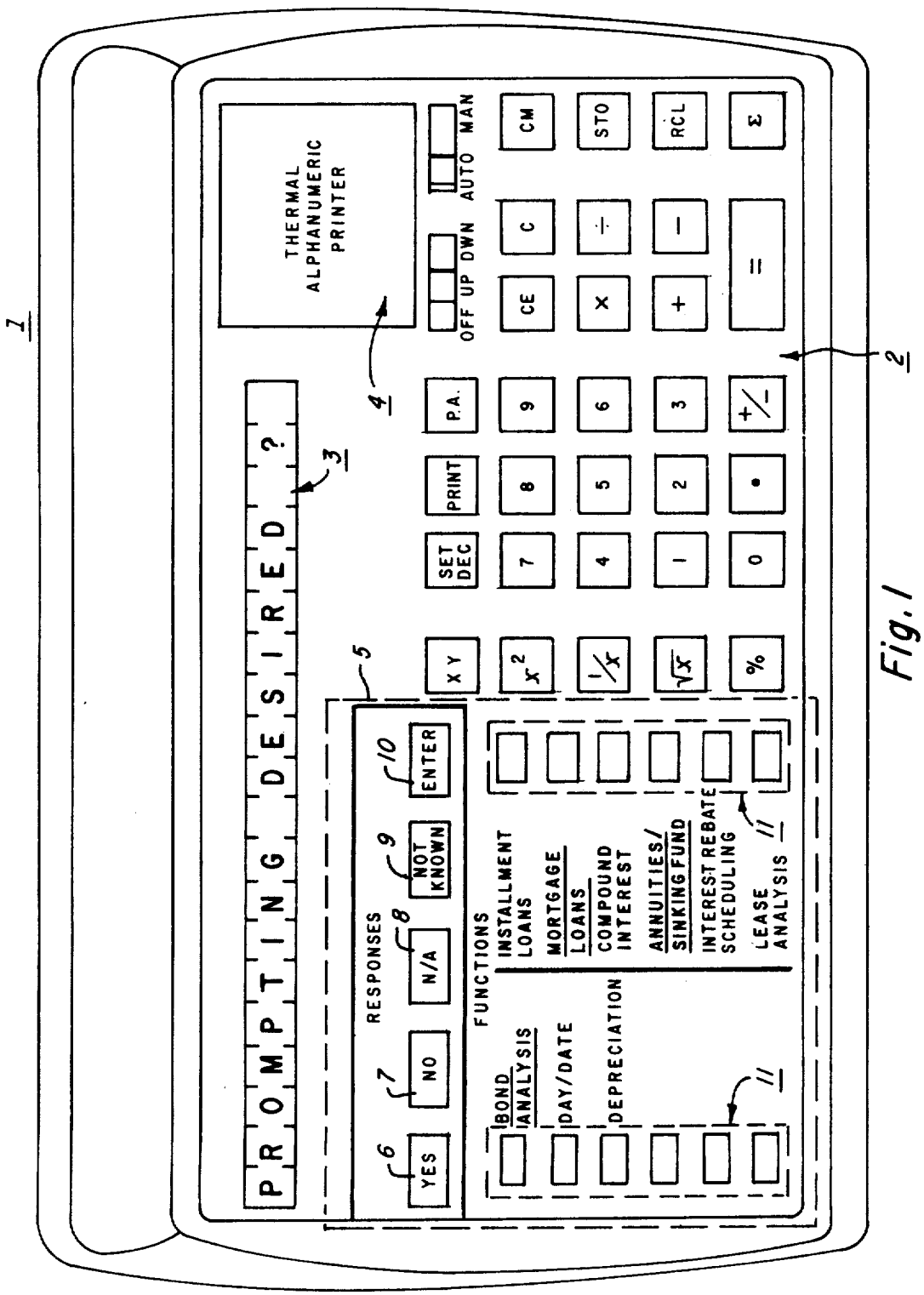
FIG. 1 depicts a prompting calculator having keyboard input and printing and display output in accordance with this invention.

Referring now to FIG. 1, there is shown a calculator 1 having a keyboard 2, a display 3, and a printer 4 in accordance with this invention. A set of data keys inputs into conventional add, subtract, multiply, divide, reciprocal, square, and square root functions. Futhermore, the conventional store, recall, summation, and clear memories functions are provided, as well as percent and add on discount keys.

Other conventional keys for a printing calculator includes a "print" key for requesting actuation of the printer, a paper advance (P.A.) key, an auto/manual print selector switch and a rounding off/up/down switch The above features and functions are well known in the art and operate in the normally accepted and understood manner.

Calculator 1, however, also includes within the dashed enclosure 5 dedicated function keys 11 and response keys 6–10. Each of the dedicated function keys 11 addresses selected memory storage which effects execution of a corresponding series of arithmetic equations representing each displayed function. That is, by way of example and not by limitation, programs are stored in the calculator memory and addressable according to the function keys for effecting:

Bond installment loan and mortgage load analysis, annuities/sinking fund analysis for determining such functions as future value, present value, rate of interest, number of periods, amounts of interest earned, nominal rate to effective annual rate, effective annual rate to nominal rate, add on interest rate, and discounts. A day/date function is included for determining a future data which is a specified number of days from a given date, and various arrangements thereof. A lease analysis algorithm is included which compares the benefits of leasing to the benefits of purchasing. A depreciation function determines one of the following when given as inputs the remaining: current asset value, salvage value, depriciable life, declining factor, and a listing of the number of years, amount of depreciation, and remaining book value.

Response keys 6–10 are utilized to communicate to the calculating system in response to the instruction displayed on output 3. For example, as shown in FIG. 1, the calculator is displaying an inquiry as to whether the user desires prompting, i.e., does the user desire that the calculator instruct the user as to the next input it requires? Obviously, when utilizing only the basic four functions, prompting is not desired. Accordingly, the "NO" response key 7 would be actuated, whereas if prompting were desired, then the "YES" response key 6 would be actuated. As will be illustrated subsequently, if a response is requested which is not relevant to the problem then the not applicable (N/A) key 8 is actuated. If a question is asked which requires the specific unknown to be inserted, then the not known (N/K) key 9 is actuated. Whenever data is input through the keyboard 2 to the prompter, the enter key 10 is actuated immediately subsequent to actuation of the data key.

A graphic illustration of a typical problem and input sequence is as follows. Assume the user wishes to determine the amount of the monthly payments he would have to deposit in a bank in order to have $10,000.00 in two years at 6% nominal interest rate compounded quarterly. A typical sequence is shown in Table I.

TABLE I

| User Activity | | Calculator |
|---|---|---|
| Turn Power on | | Prompting Desired |
| Press: Yes | | Which Catagory |
| Press: Annuities | | Listing Desired |
| Press: No | (Enter) | NOM interest rate/yr |
| Press: 6 Enter | (Enter) | Compounding per year |
| Press: 4 Enter | (Enter) | No. Payments per year |

TABLE I-continued

| User Activity | | Calculator |
|---|---|---|
| Press: 12 Enter | (Enter) | Total No. Payments |
| Press: 24 Enter | (Enter) | Payment Amount |
| Press: Unknown | (Enter) | Present Value |
| Press: N/A | (Enter) | Future Value |
| Press: 10000 Enter | | (Result) |

A detailed branch type flow chart of the above sequence is utilized which is explained with respect to FIG. 12.

Figure 2:
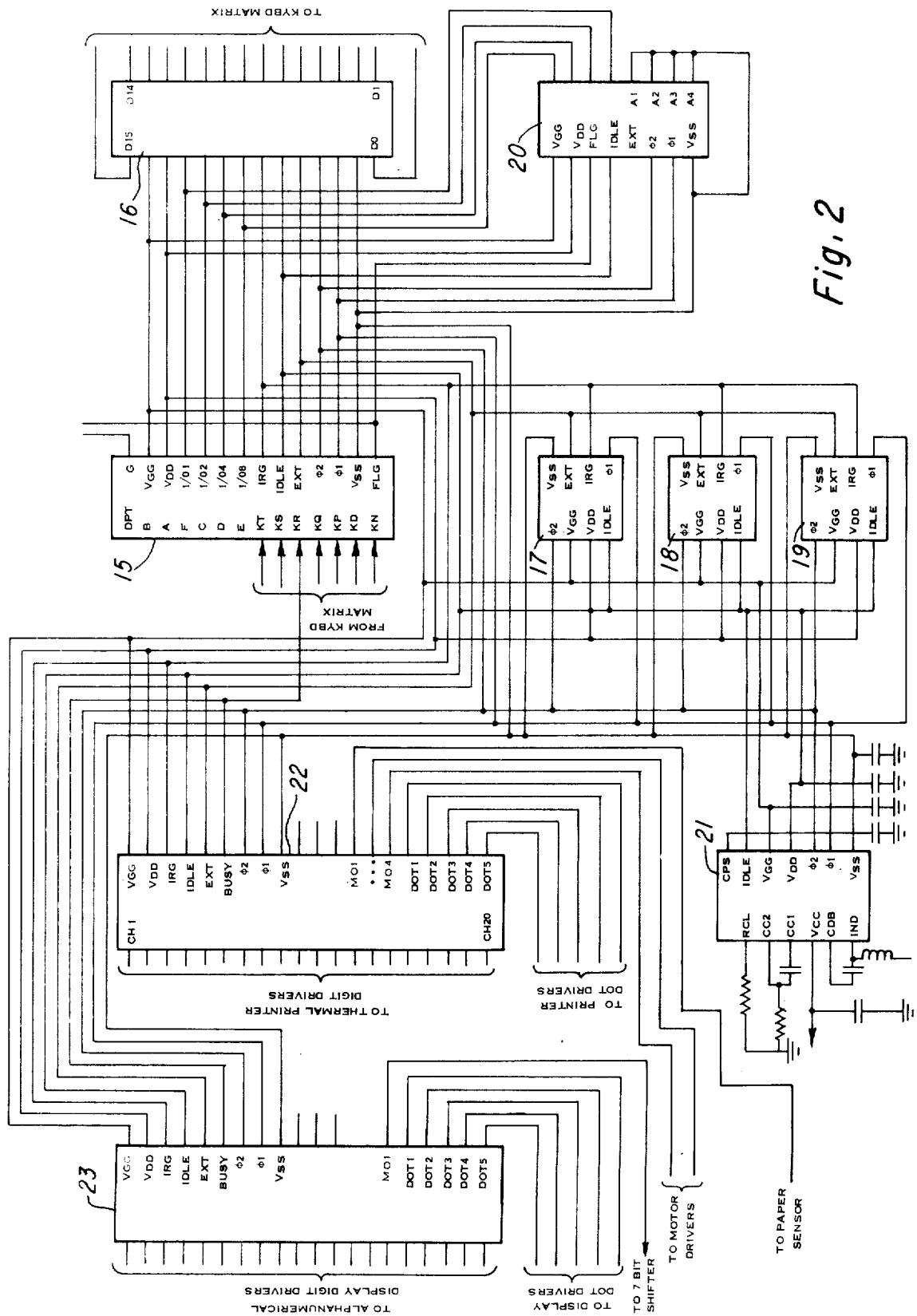
FIG. 2 is a system diagram of the semiconductor chip interconnection which is utilized in implementing the invention.

Referring now to FIG. 2, there is shown one embodiment of a wiring diagram of an exemplary chip set utilized in implementing the prompting calculator according to this invention. Nine MOS/LSI semiconductor chips are shown interconnected, including the arithmetic chip 15, the SCOM (scanning and read-only-memory) chips 16-19, an external data memory chip 20, a clock/voltage regulator chip 21, a display chip 23, and a printer chip 22. Not shown in FIG. 2, but understood to be included in the complete system, is a thermal printing mechanism such as a North American Phillips Motor No. B82203-M4 coupled to a Texas Instruments Thermal Printhead No. EPN-3100, also employed in the commercially available Model TI-5050 printing calculator. Conventional digit and dot drivers are utilized, and a series of 5 × 7 dot VLED display matrices are used with like positioned dots in each row commonly connected, and each row being individually addressable as will be explained with respect to FIGS. 8a and 8b.

Functional operation of the system of FIG. 2 will be explained in detail subsequent to a brief description of the signal representations on the various lines interconnecting the chips.

The control signals generated by the arithmetic chip 15 include the control signals:

EXTERNAL (EXT) indicates that the arithmetic chip is addressing the printer chip 22 or SCOM storage and indicates which ROM storage therein (constant or program) is being addressed, and further communicates in multiplexed bit fashion the HOLD and COND controls signals. It also communicates data to the printer/display chip;

The HOLD bit in EXT indicates that an interrupt is desired in the normal sequencing of the ROMS in the SCOMS to allow additional executions by the system before the next instruction word is to be executed;

The CONDITION (COND) bit in EXT indicates that a condition flag has been set indicating status of a particular flag or the results of a comparison of flags;

IDLE (IDLE) is indicative of the idle condition of the data chip, i.e., whether the data chip is actually in the calculating mode (non-idle) or in the display or scanning mode (idle), and provides synchronization of the timing generators of the SCOMS to the timing generators of the arithmetic chip;

FLAG A (FLGA) is the serial output of the Flag A register in the SAM at an output rate determined by COND:

FLAG B (FLGB) is the serial output of the Flag B register in the SAM of the arithmetic chip or is the B1 or first bit of the B register output;

DISPLAY TIME (D TIME) comprises an instruction cycle of sixteen S times duration, wherein the D times are generated in cycles of sixteen so that D times precess from the particular D time of the preceding cycle;

KEYBOARD INPUTS (K LINES) are signals from the keyboard for entering externally commands to the arithmetic chip;

INSTRUCTION WORDS (IRG) indicate the particular instruction word comprising thirteen bits ($I_0$-$I_{12}$) stored in a particular SCOM memory storage unit;

BUSY (BUSY) represents the condition of peripheral chips such as the printer, as determined for example by the printer chip 18 that the printer is not/is busy and can/cannot receive another command for printing;

INPUT/OUTPUT (I/O) are data lines conveying data bits from any of the various data registers and memories located in the arithmetic chip, SCOM chips, and 10-register chips.

Referring again to FIG. 2, the arithmetic chip 15 provides output data information from registers B and/or A and Flag register A to the display chips. The segment and digit drivers (not shown) comprise conventional driver circuits for actuating the above-mentioned display 3 and printer 4.

The SCOM chip provides the D times for selectively scanning in sequence the keyboard. The D time strobing of the keyboard is discussed with respect to FIG. 10.

The SCOM chip 12 is responsive to EXT and IDLE command signals from the arithmetic chip and generates in response thereto the D times, the instruction word $I_0$-$I_{12}$, (IRGA and IRGB) and data from the constant ROM on the I/O lines, all of which is communicated back to the arithmetic chip and to the data memory chip 20.

The SCOM chips 17-19 depicted are similar to the SCOM chip 16 and allow expanded calculator instruction memory capacity. The ROM chip is responsive to the EXT and IDLE commands from the arithmetic chip for providing a 1024- additional instruction word capacity per additional ROM chip.

The multi-register chip 20 is another peripheral chip providing expanded data storage capacity of up to ten registers to the calculator system of this invention. The 10-register chip is responsive to Flag A, IDLE, and I/O information from the arithmetic chip for providing store and recall data through the I/O lines in communication with the arithmetic chip.

The printer chip 22 and display chip 23 are responsive to the I/O information from the arithmetic chip and multiregister chip 20 and to the EXT, and IDLE commands from the arithmetic chip for printing and display in accordance with data on the I/O lines.

A better understanding of the calculator system will be realized when reading the following functional description of the specific chips in FIG. 2.

Shown in FIGS. 3a-3b and FIG. 4 is a detailed functional block diagram of the arithmetic chip and the SCOM chip depicted in the calculator system of FIG. 2. A detailed description of the arithmetic and SCOM chips is found in conpending application, "Multi-Chip Calculator System," Ser. No. 397,060, filed Sept. 13, 1973, by M. J. Cochran et al, which is hereby incorporated by reference. A brief functional description thereof is generally reproduced from Ser. No. 397,060 as follows for the sake of convenience and clarity. It is understood that in the block diagrams of FIGS. 3a-3b and 4, a connection represented by a single line may represent a plurality of actual hardware interconnections, and for ease and simplicity of illustration, a single line may represent a plurality of different functions. The calculator system of this invention includes on the SCOM chip a main program ROM 40 responsive to decode and gating means 41 and 42, respectively, which selectively couple the address word in the address register 43 to the ROM for controlling which ROM location is being addressed. A holding register 44, in combination with an add-1 circuit 45, selectively generates a new ROM address in the register 43 when a branch instruction word has been executed. Branching is implemented utilizing a relative technique wherein, instead of conventionally jamming in a complete new address, the old address will be incremented positively or negatively by a relative numerical amount to generate the new address.

An instruction register 26 is responsive to the output of the ROM 40 for storing the instruction word $I_0$-$I_{12}$ which enters the instruction register 26 in parallel. Thereafter, the instruction word is serially communicated to the arithmetic chip, to the printer/display chips, and to the data memory chip 20 through the output buffer 27 which is under control of the ROM 40. A decode PLA 28 is responsive to the instruction register 26 after the instruction word has been transmitted through the buffer 27 and re-entered into the instruction register 26. The decode PLA 28 decodes the instruction word providing store and recall commands to the registers F and G, 29 and 30, respectively, and to the constant ROM 35, through the I/O control circuit 31. As shown in FIG. 2, SCOMS 17-19 do not have I/O lines connected, and only instruction word memory is therein utilized.

After the instruction word leaves the buffer 27 for transmission to the various chips, it is further communicated to the adder 32 and to the branch comparator 33, wherein, if the $I_{12}$ bit of the instruction word indicates a branch is to be executed, the branch comparator enables the holding register 44 to accept the new instruction word from the adder 32, which adds a positive or negative increment to the old address storage received from the address register 43 to generate the new address.

On SCOM 16, the constant register address 34 is responsive to a command word EXT from the arithmetic chip for addressing a constant in the constant ROM 35 which provides up to sixteen 16-digit 4-bit constant words. Logic recall circuitry 36 couples the constant register address 34 to the address decoder 37 of the constant ROM 35.

Further implemented on the SCOM chip 16 is an S counter 38 and a D scan generator 39 for generating the S and D time timing signals of this calculator system, which D times $D_0$-$D_{15}$ are outputed to the keyboard as indicated in FIG. 2. Both generators are synchronized by a command from the arithmetic which command is synchronized with the D and S times on the arithmetic chip.

The arithmetic chip is generally responsive to the instruction word IRG from the SCOM chip and to external operator inputs from the keyboard and other peripheral chips for executing the particular instruction word and performing the indicated arithmetic operation. The main data registers in the calculator system of this invention are registers A-E, 50a-50e, respectively. They are implemented in sequentially addressed memory (SAM) form which are driven by a commutator 51 which also drives a push/pull matrix 52 for generating timing signals. Also implemented in SAM format are four 1-bit registers utilized as two flag registers, Flag A, 53A; Flag B, 53B; the keyboard register 54, a multi-purpose register; and a subroutine register 55. Although SAM's advantageously provide the register function, it is understood that conventional shift registers could be utilized. Data in registers A-E is acted upon by the adder circuit 55 as controlled by the selector gates 56, ALU control 57, carry/borrow generator and BCD corrector control circuit 59, and BCD corrector 61.

Selector gates 62 control exchanging and recirculation of registers A-E. The calculator displays its results by outputting the contents of register B and/or register A, preferably register A, and the F lag A register into the keyboard register 54 through register R5, 65, from which it is bussed on EXT to the printer/display chips 22, 23 which provide the output as shown in FIG. 2. The keyboard register is implemented as a SAM and has each bit addressable for setting the state thereof. For example, the six-bit address is provided by setting the $S_3$–$S_8$ bits for communicating to the display chips 22, 23.

A fifth 1-bit register, register 5, 65 of four digits duration, is a multi-purpose register responsive to the output of the adder circuit 55, to I/O lines, and to the instruction word from the Flag Decode PLA 72. R5 control 66 provides control data inputs and control inputs to register 5 responsive to decoded instruction information. A feature of the chip set herein described is the provision of means allowing four bits of the instruction word to be entered into register 5 upon the "NUM➡R5" command. Since register 5 is coupled to the main SAM registers and to the ALU, such provision allows use of a subset of the instruction word as data for execution. Such a feature not only facilitates software generation of data required in various subroutines, but also allows addressing of the printer chips 22, 23 for the display of the prompting command, as further discussed with respect to FIG. 12.

The push/pull matrix 52 provides timing information to the D time generator 67 which is a ring-tail counter to generate one D time or instruction cycle comprising sixteen S times. Generator 67 counts backwards from 15 to zero in cycles, causing the D times to appear to recess in sequence. The D/S Test and Flag Mask Comparator 68 is responsive to S and D times for generating sync pulses and masking signals for flag operations, respectively, and for setting COND. The wait generator 69 is responsive to the D time generator and to a decoded instruction word from decoder 72 for generating a wait command to logic and encoder 77 for controlling keyboard scanning.

The decimal point/D comparator 71 is responsive to D times and to register 5, 65, for generating a decimal point at the proper timing location and for ending zero suppress.

Decoding of the instruction words from the SCOM chip are decoded locally on the arithmetic chip. That is, the instruction words are initially decoded in the mask decode PLA 50 for generating masks to the arithmetic logic unit for communicating such information as decimal point location, mantissa, and exponent location. The instruction word is then communicated to the D/S flag mask comparator 68 and also to the flag decode matrix 72 which controls input and output of the flag registers 53a and 53b through the flag input/output control 73. The instruction word also is communicated from the mask decode PLA 50 to the R decode matrix 73 and then to the sigma decode matrix 74 for controlling the selector gates 56 and 62 for register selection/functioning.

External inputs are supplied to the arithmetic chip by a keyboard operator through the keyboard 46 via K lines 47 to an encode PLA 75. A particular keyboard actuation commands to the hardware clear circuit 76 generates proper commands for initializing and resetting the calculator upon battery actuation. The encode PLA 75 provides encoded K line information to the logic and encoders 77 and to a K comparator 78. The logic and encoder 77 selectively supplies D time and K coordinates in serial form to the keyboard register/subroutine register control 79 for entry into the keyboard register 54. The K comparator 78 allows determination that a specific K line was not actuated, or conversely determines which K line, by a process of elimination, was actuated. This information is communicated to a condition circuit 80 which is a versatile latch circuit responsive to a plurality of functions for providing status of various conditions at preselected times. Idle latch 81 is responsive to the flag decode PLA 72 and provides information to the display output controls that the calculator is or is not in an idle or non-calculating state for appropriately blanking the display. This information is further communicated to the idle terminal as indicated for transmission to the SCOM and printer/display chips for synchronizing the S and D generators there.

The above described chip set utilizing the SCOM and arithmetic chips is now available commercially in the the SR-50 calculator sold by Texas Instruments Incorporated.

Figure 5:
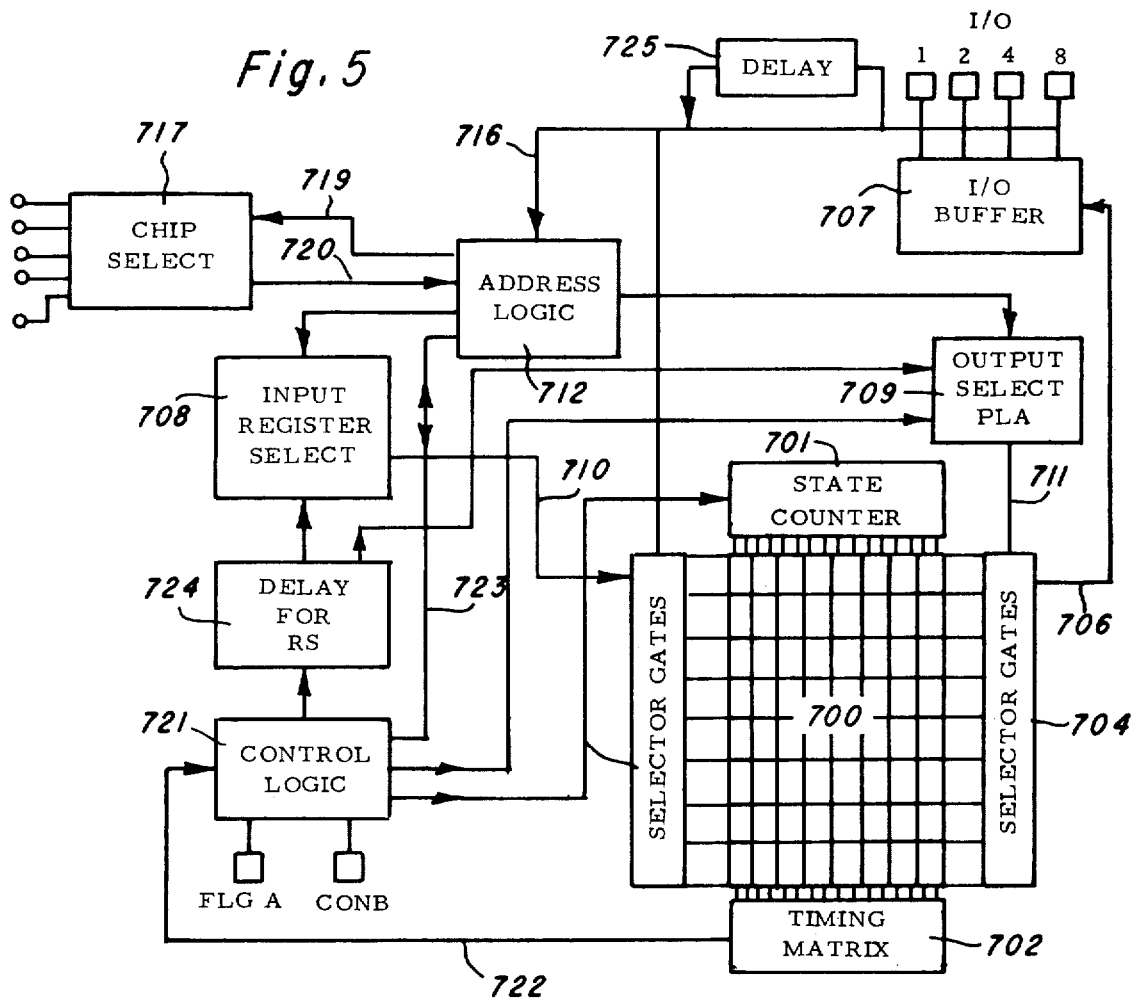
FIG. 5 depicts a functional block diagram of the external data register chip utilized in the system of FIG. 2.

Referring now to FIG. 5, there is shown a functional block representation of the external data memory register chip 20 of FIG. 2. A detailed description of the data memory chip 20 is found in copending patent application, "Expandable Data Storage In A Calculator System," by M. J. Cochran, filed June 11, 1973, Ser. No. 368,901, now abandoned and replaced by continuation application filed July 25, 1975 and assigned to the assignee of this application. The detailed description therein found is hereby incorporated by reference, with a brief functional description of the operations of the logic circuitry in FIG. 5 generally reproduced for the sake of clarity and understanding.

The chip herein described contains ten registers implemented in a SAM 700. A SAM is a sequentially addressed memory as described in U.S. Pat. No. 3,893,088, assigned to the assignee of this application; the particular type of SAM used in a preferred embodiment of this invention is described in copending application, Ser. No. 334,493, by Richard Chang, "Memory Cell For Sequentially Addressed Memory Array," filed Feb. 21, 1973 now U.S. Pat. 3,851,313, and assigned to the assignee of this application. The memory 700 contains ten registers of sixteen digits each, arranged in BCD so each register is actually four parallel registers. Thus, 10 × 16 × 4 or 640 bits are contained in the memory 700. A state counter 701 generates state times $S_0$ to $S_{15}$ which correspond to the state times in the arithmetic chip. This state counter is a ring counter of contemporary type. A timing matrix 702 is connected to the SAM 700 to be actuated by the same timing signals which sequentially address the memory; the matrix 702 generates a number of timing signals for use in the chip at various points. Data in the memory 700 may be operated on in several ways under control of selector gates 703 and 704 on the left and right sides of the SAM. For example, data may be input, output, recirculated, right shifted, and cleared in the SAM 700. The data input, recirculate and clear functions are implemented by selector gates 703 on the left side, and data output and right shift are implemented by selector gates 704 on the right side. Data input is from intput-/output pins I/O 1 to I/O 8 which are connected to the data chip, via connection 705; data output is to the same I/O pins via connection 706 and I/O buffers 707. Selection of a particular register among the ten in memory 700 to input data into or to be written into (or cleared) is accomplished by input register select decoder 708 and selection of a particular register to be read out of is accomplished by an output select decoder 709. The outputs 710 and 711 of the decoders 708 and 709 function to open and close specific gates within the groups of select gates 703 and 704 to perform the desired function. The input and output selection decoders 708 and 709 receive outputs from an address logic arrangement 712.

The ten-register chip is addressed by a selectively chosen portion of a data word appearing on the I/O pins, which portion is determined in accordance with a particular gate program masking step during manufacture. A format for a data word typically is 16 four-bit digits with only the first four digits used. The least significant digit, occurring during time $S_0$, is ordinarily used in the usual processing of data in the data chip to indicate the position of the decimal point; in the ten register chip, $S_0$ is used to define the operation to be performed. Within the least significant digit 713 or $S_0$, the least significant bit indicates either an input or an output function, i.e., the $S_0$ "1" bit signifies input function by a 1 and an output function by a "0". The other three bits are used to signify either input of data or input of zeros which clears the registers. Clear is a special case of input because zeros are inputed; several possibilities of clear operations exist, these being (1) clear a specific register in a specific chip, (2) clear all registers in a specific ten register chip, or (3) clear all ten register chips. The 2 and 4 bits in $S_0$ time define which of these clear functions shall occur; the specific bits and their code are gate programmable in the address logic 712. One of the ten registers is defined by a four bit code sent during the $S_2$ time; this appears on the I/O pins in parallel, and is stored in the proper place in address logic 712 via input 716 and decoded in register select decoders 708 and 709. For example, if an output operation from register seven was desired, the first digit would be 0000 and the $S_2$ digit would be binary seven or 0111. The third item in the address word is the chip select digit occurring at $S_3$. One of sixteen possible ten register chips may be selected by the four bit binary code occurring at $S_3$. The $S_3$ digit is received by the address logic 712, stored, and applied to chip select logic 717. Four pins 718 are available external to the package, and are connected when the package containing the ten register chip is affixed to a printed circuit board upon manufacture, to be connected to either 1 $V_{SS}$ or 0 $V_{DD}$ to define a four bit code. When the four bit chip select digit 715 applied to chip select logic 717 via connection 719 from address logic 712 matches the code wired into the pins 718, then a select signal is applied back to the address logic via connection 720 to render the chip able to execute the designated operation. Another input $\overline{CS}$ to the chip select logic 717 provides higher order chip selection, i.e., if more than 16 ten register chips are needed.

In order to cause the ten register chip to accept a data word as an address and perform the desired function, a flag is generated in the arithmetic chip and outputed via FLGA pin, from whence it is received at FLGA pin on the ten register chip and applied to control logic 221. If this special enabling function were not provided, the ten register chip would confuse data ordinarily appearing on I/O pins with an address word as in FIG. 3. A dedicated flag, used for no other purpose, is used in the program of the arithmetic chip to mean that the ten register chips are to be addressed. This may be a flag in Flag A register at time $S_{14}$, for example. Also, since flags are used to send annotations to the display, e.g., minus sign, error, overflow, etc., the IDLE designation, as descirbed, by CONB, in the above referenced application, "Expandable Electronic Calculator," Ser. No. 444,226, is used to distinguish between the arithmetic chip being in the idle or not idle operating condition. IDLE is also applied to control logic 721 as seen in FIG. 2. When $\overline{IDLE}$ is zero, the data chip is in idle or display mode and the flags are in time with D's or D-times; at such time, the ten register chip is never addressed, so flags are ignored at logic 721. When $\overline{IDLE}$ is one, the data chip is in not idle, and flags are in time with S-times; at such time, a flag at ten register chip time $S_{14}$ will cause the ten register chip to accept an address. The control logic 721 also generates several control signals used throughout the chip as will be described, and for this purpose receives timing signals from the timing matrix 702 via connections 722, as well as signals to and from the address logic 712 via connections 723.

An input instruction sequence for operating the ten register chip occupies four instruction cycles in the arithmetic chip (actually five in the ten register chip). The first instruction is "Set Flag"; during this instruction cycle a logical 1 is set in Flag A register at a particular S time for example, $S_{14}$. This causes the control logic 721 to condition the ten register chip, particularly the address logic 712, to receive an address. The next instruction is "Reg to I/O;" during this instruction cycle a register in the arithmetic chip is read out on the I/O lines, this register being B or C, for example. Whichever register is used, contains the address as seen in FIG. 3. The address is read into the address logic 712 and stored. The third instruction is "zero flag" meaning that the Flag A register $S_{14}$ position in the arithmetic chip is reset to zero by an appropriate instruction word; this is to prevent the $S_{14}$ flag from inadvertently activating the ten register chip again. The fourth instruction is "A Reg to I/O," whereupon the contents of the A register in the arithmetic chip are presented to the I/O pins from which the sixteen digits of information in the A register may be written into the selected register in the ten register chip. A delay of one state time in the ALU of the arithmetic chip in the path between the A register and the I/O pins causes the information in the selected register of the memory 700 of the ten register chip to be displaced one state time. For this reason, the data entered in the ten register chip must be right-shifted by one state time so that when it is brought back into the arithmetic chip to be used in a subsequent operation it will be in the proper time position. So, immediately following the A Reg to I/O instruction, during the next instruction cycle, the ten register chip automatically right-shifts any data word just entered. This is accomplished by generating a one-instruction-cycle delay in a delay circuit 724, and applying the delayed signal to the intput register select logic 708. The right shift function is produced without an instruction word from the data chip; the program of the arithmetic chip can go on to other operations while the 10-register chip is executing this automatic right shift function. The delay of one state time between the A register in the arithmetic chip and the selected register in the 10-register chip results in another problem in addition to requiring right shift. That is, the sixteenth digit, at $S_{15}$, does not arrive until $S_0$ of the next cycle during which automatic right shift is occurring. So, to avoid overlay, the sixteenth digit is held in a sample-and-hold circuit 725 until $S_{15}$ of the next or automatic right shift cycle, then it is inserted in the $S_{15}$ slot. Thus, only fifteen digits go through right shift, the sixteenth is held and then inserted at $S_{15}$ of the following instruction cycle.

An output operation using four instruction cycles is simpler in that right shift is not required on the 10-register chip. Again, the first instruction on the arithmetic chip is Set Flag A at $S_{14}$. The second instruction word produces an address word serially on the I/O pins; the first digit of the address word is 0000 meaning output operation, the second digit is not used, and the third and fourth define register select and chip select. The third instruction word is Zero Flag A at $S_{14}$. The fourth instruction word is I/O to A Reg, during which the selected register in the memory 700 is outputed through connection 706 and I/O buffers 707 to the I/O pins and thence to the A register in the arithmetic chip via the ALU. The delay in the ALU must be again accounted for, so the first digit is communicated from the 10-register chip one state time early; output occurs starting at $S_{15}$ of the third cycle and ending at $S_{14}$ of the fourth cycle.

Figure 6:
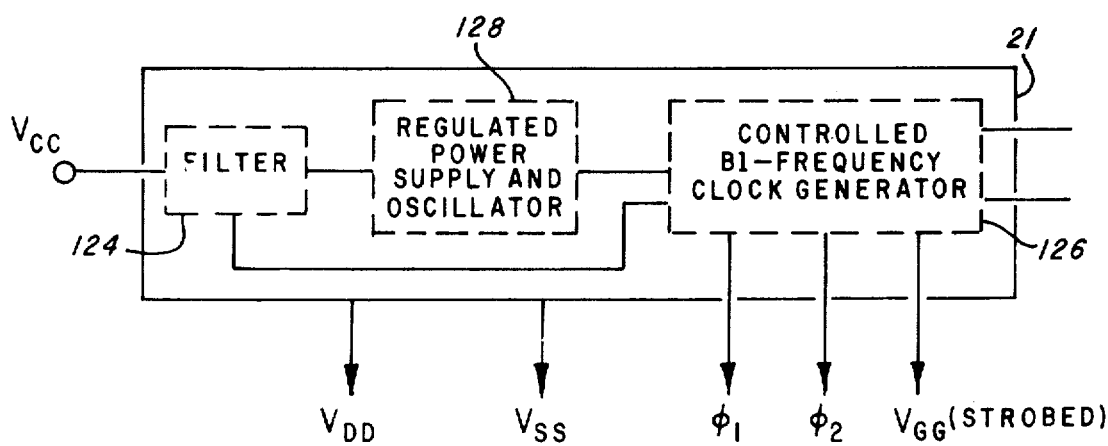
FIG. 6 illustrates a functional block diagram of the clock and power supply chip utilized in the system of FIG. 2.

Referring now to FIG. 6, there is shown a functional blocked diagram of the power supply and clock chip 21 of FIG. 2. A more detailed description of a similar chip is found in copending patent application, Ser. No. 329,008, entitled "Driver Means for LSI Calculator," filed October 2, 1973, by M. J. Cochran. Modifications thereto will be readily apparent to one having ordinary skill in the art in providing the functions described below. The driver chip 21 is responsive to an external supply voltage $V_{CC}$, typically at least 1 dry cell battery supply of 2 to 6 volts. It generates therefrom a $V_{DD}$ voltage, and clock voltages $\phi1$ and $\phi2$.

Figure 9A:
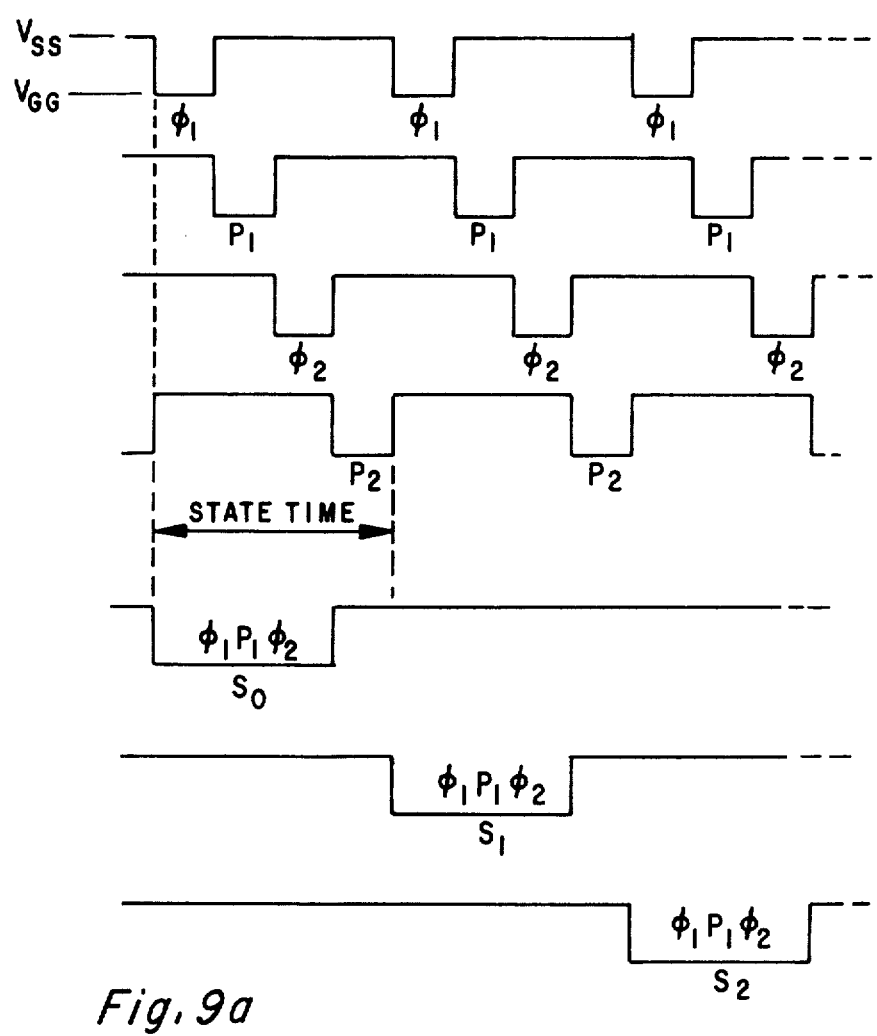
FIG. 9a and 9b depict the system cycle and subcycle timing sequences utilized in the system of FIG. 2.
Figure 9B:
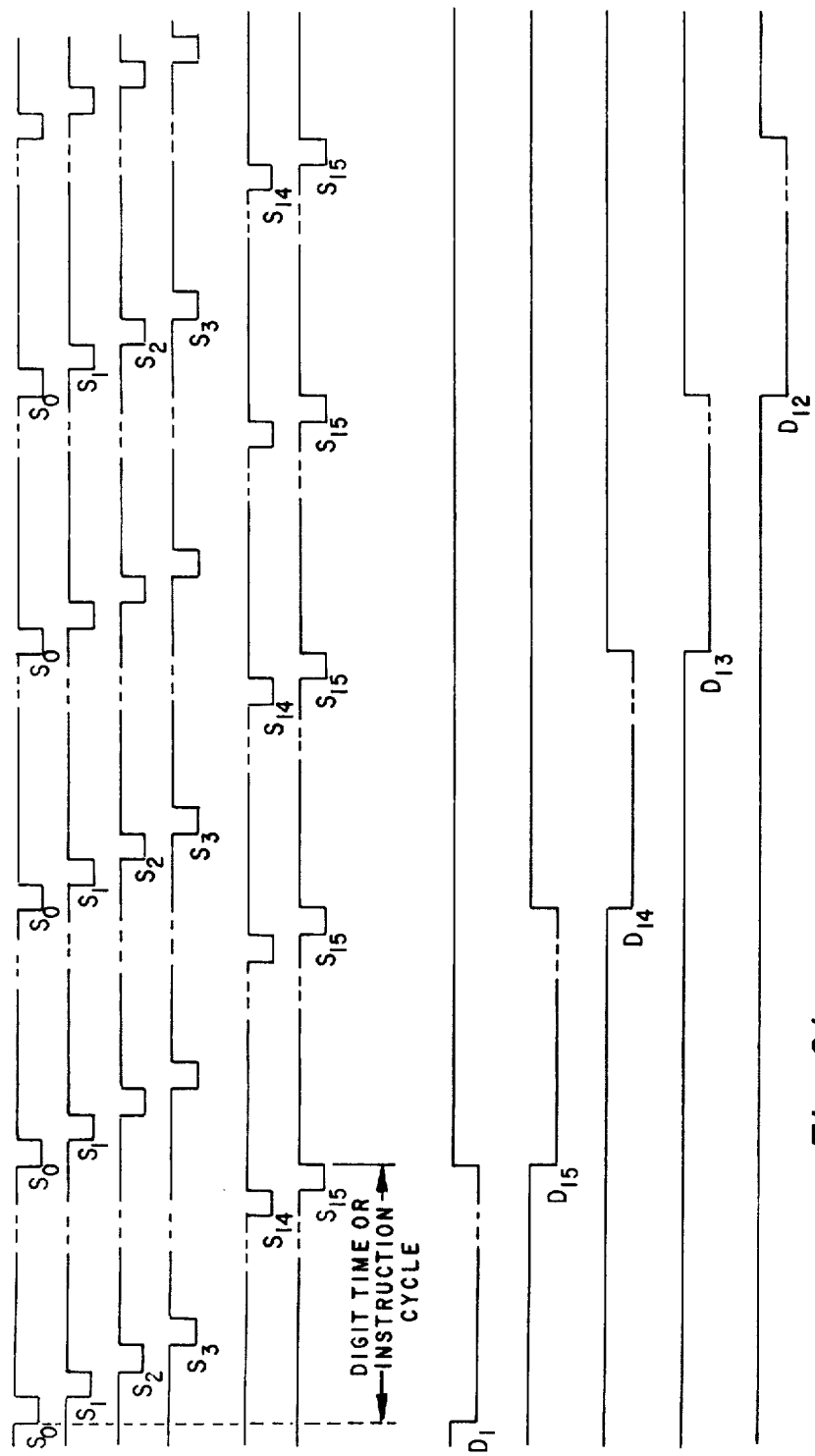

Driver chip 21 comprises a controlled bi-frequency clock generator 126 which is responsive to a regulated voltage supply, an oscillator 128 and to a filter 124. Supply and oscillator 128 comprises a regulator of the type known in the industry as a switching regulator utilizing a catching diode and an inductor. Filer 124 comprises a conventional voltage doubler utilizing an L-C circuit. Referring to FIG. 2 once again, an RCL terminal is shown resistively coupled to circuit ground for setting the lower frequency of the two frequency clock system. Terminals CC1 and CC2 are shown coupled to circuit ground through an RC network which determines the pulse width of the $\phi1$ and $\phi2$ clock signal outputs. Typically the pulse widths are each one microsecond with the $\phi1P1$, cycle constituting a four microsecond cycle in the high frequency. In the low frequency, $\phi1$ and $\phi2$ typically are two microseconds each with P2 and P1 each equal to 12 microseconds duration. FIGS. 9a and 9b further describe the timing cycles used in this calculator system. Terminal CDB is capacitively coupled to the IND terminal, which is itself inductively coupled to $V_{CC}$. The capacitor and inductor coupled to the CDB and IND terminals are the doubler capacitor and inductor utilized in the switching regulator above mentioned.

Figure 7:
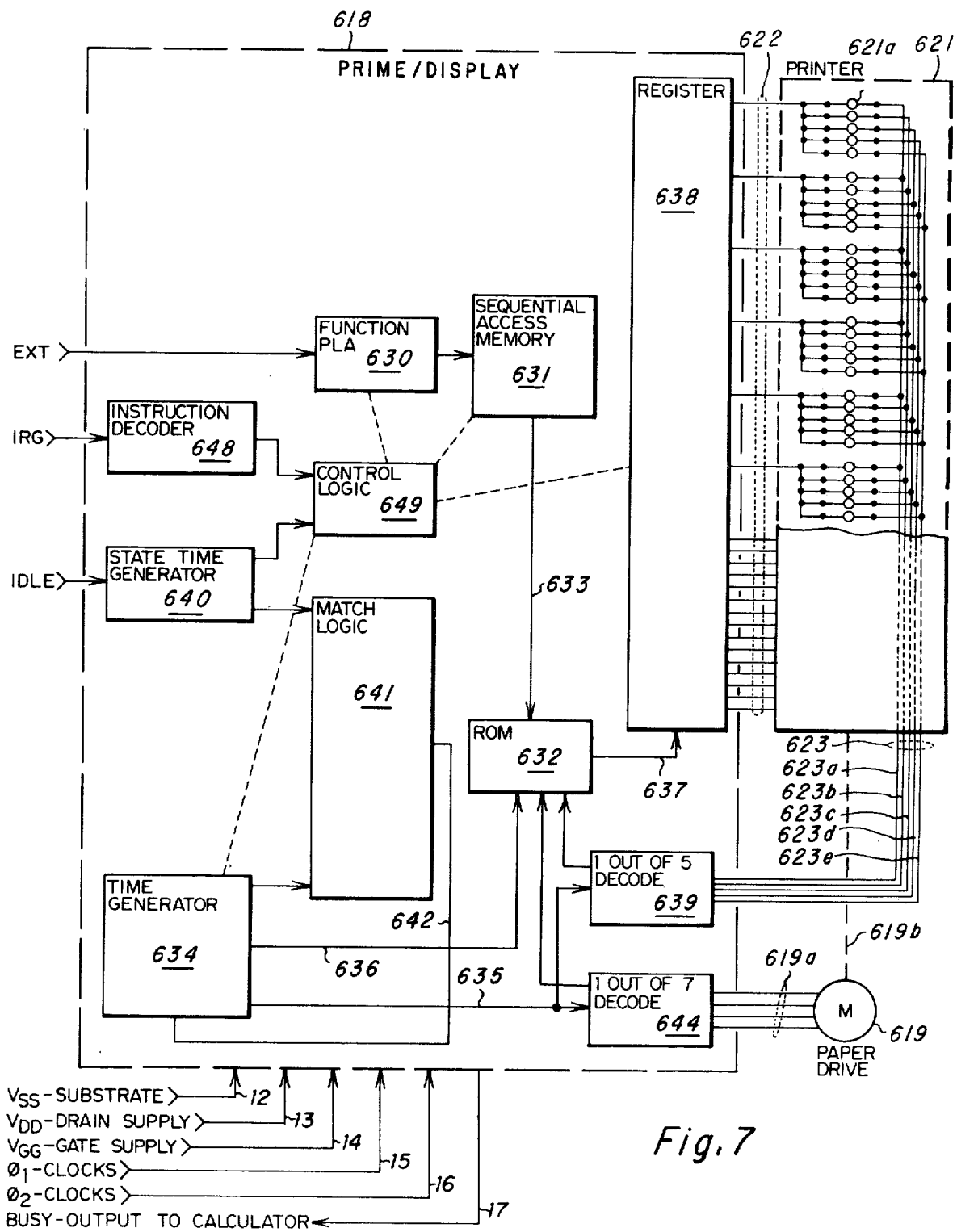
FIG. 7 depicts a functional block diagram of the printer chip utilized in the system of FIG. 2.

Referring now to FIG. 7, there is shown a functional block diagram representing both the printer chip 22 and the display chip 23. A detailed description of the printer chip 22 is found in copending patent application, Ser. No. 428,492, filed Dec. 26, 1973, entitled "Thermal Line Printer", by M. J. Cochran et al, which is hereby incorporated by reference. The description found in copending application, "Strobed Matrix Display," filed concurrently herewith by Cochran et al, teaches the slight modifications necessary to Ser. No. 428,492 for effecting display, which is herein incorporated by reference.

FIG. 7 is a block diagram of a large scale integrated circuit chip 618 which utilizes calculator outputs and controls for the purpose of driving a thermal printbar (as shown), to print on thermally sensitive paper characters which are formed on the basis of a dot matrix. The present example involves twenty 5 × 7 dot matrices for printing a line of up to twenty characters. As will be apparent, FIG. 7 is suitably modified for driving a twenty 5 × 7 dot VLED display.

A binary coded data stream from the arithmetic and SCOM chip is received by way of line EXT leading to chip 618. Thirteen bit instruction words are derived from the read-only-memory of the SCOM. Instruction words are received by way of line IRG. A sync signal is received by way of the IDLE line and is a signal having known time relation to timing signals in the calculator, such as a programmed change of state at a specific D and S time.

The line 617 supplies to calculator 10 a signal indicating that chip 618 is busy, engaged in an assignment task not completed.

Components on chip 618 operate collectively to energize resistive-type heaters formed in the printhead 621. The printhead 621 comprises a linear array of 100 heaters 621a. Heaters 621a are arranged in sets of five. Collectively, twenty sets of five heaters per set span a thermally sensitive paper tape on which the output of the calculator is to be printed. For each character, the system prints a 5 × 7 matrix selectively one row at a time with the paper being stepped by a motor in the interval between printing of the successive rows. Each set of five heaters is spaced apart physically to provide space between printer characters. Twenty character strobe lines 622 are connected to printhead 621. Each of strobe lines 622 is connected to each of a set of five heater input terminals. Column strobe lines 623 are five in number and are individually connected to the first, second, third, fourth and fifth heaters, respectively, in each set. More particularly, line 623a is connected to the first heater in each of the twenty sets. Line 623b is connected to the second heater in each of the twenty sets. Lines 623c, 623d and 623e likewise are connected to the third, fourth and fifth heaters, respectively, in each of the twenty sets.

A data stream on line EXT is supplied to a function programmable logic array 630, the output of which is stored in a storage device 631. One such storage device is a sequentially addressed memory (SAM) as now well known in the art and described in detail in above referenced application, Ser. No. 163,565. The provision of such a decoder 630 allows communication of both character and function print data to be supplied on the same serial input, thereby minimizing pin requirements. SAM 631 stores a six bit word to designate by decoding each of the twenty characters that are to be printed by the printhead 621. A read-only-memory (ROM) 632 is provided to store a 35 bit code for each of 64 alphanumeric characters capable of being printed by a printhead 621. A bus 633 supplies the code from SAM 631 to ROM 632 for a one-in-seven decode and by way of a three line bus 636 for a one-in-five decode so that there is produced on the output line 637 a serial binary code which is stored in storage means 638 such as a shift register. When twenty bits are stored in shift register 638, representative of the locations of desired dots to be printed, selected heaters are energized locally to burn the thermally sensitive paper. The three line bus 636 is also connected to a decoder 639 to energize the five line output bus 623.

Sync timing pulses on line IDLE are applied to a state time generator 640, the output of which is applied to a MATCH logic 641. The timing generator 634 is also connected to MATCH logic 641, whose output is connected by line 642 to the generator 634 for synchronizing the same and for control of the time relationship of the signals on the output buses 635 and 636. Bus 635 is connected to a decoder 644 to control lines 619a which energize step motor 619. Motor 619 operates a mechanical linkage 619b to step thermally sensitive paper tape past the printhead 621.

Instruction words on line IRG are applied to an instruction decoder 648. The output of decoder 648 is applied to control logic 649 which is connected to various elements throughout the system as will be shown.

A general functional description of the load-print cycle is as follows. A zero print command (ZP) over IRG at the beginning of the load sequence clears the SAM 631. The characters to be printed are loaded into the SAM 631 from right to left, i.e., the first character loaded will be the right most character in the printed output, and the last character loaded will be the left most character in the printed output. Each "character" is loaded by sending its proper seven bit code over EXT, six of which bits are loaded into SAM 631 upon a subsequent character print (CP) command received over IRG, and decoded in decoder 648 for activating control logic 649 accordingly. If a blank in the printed output is desired, a step print (SP) command is transmitted over IRG for actuating logic 649 effecting a six bit code to be entered into the SAM prepresenting a blank.

If a function command is transmitted over EXT, its seven bit code is communicated to the PLA 630. A function print command (FP) transmitted on IRG actuates logic 649 to enable a seven bit code representing the function to be decoded by the PLA 630 which generates in response thereto three six bit codes representing a three character function grouping to be loaded into the SAM 631. When all twenty characters plus blanks desired in the output have been loaded into the SAM 631, a print command (PP) over IRG via logic 649 actuates timing generator 634 to begin sequencing. Generator 634 strobes the first row of each selected ROM grouping corresponding to each A group of the twenty character printer, while the SAM 631 powers up in sequence each selected character code paritioned in the ROM 632. Sixty-four codes are partitioned in the ROM 632, and the SAM 631 powers up only the grouping in the ROM corresponding to the character desired to be printed at that particular strobed time. That is, twenty six-bit words address in sequence twenty blocks of ROM 632 for burning the first dot of each A group. Then the second dot of each A group is enabled due to decode 639 and after twenty additional addresses from the SAM 631, with each address being communicated during one S time, the second dot of each dot group is printed, etc. After a total of 5 × 20 S times, the first row of dots is completed for all twenty characters. The decoder 644 addresses the rows of the ROM representing the second row of each character. After a total of 5 × 20 × 7 or 700 addresses from the SAM 631, a complete character line is printed.

Time generator 634 counts instruction cycles and waits between activations of the one-out-of-seven decoder 644 until sufficient time has elapsed, i.e., 5 milliseconds, to complete the burn. For effecting display of VLED matrices the 5 millisecond delay is unnecessary and generator 634 operates at the faster rate of preferably 90 KHz.

Modification to the above circuit is explained in "Strobed Alphanumeric Display System," Ser. No. 439,474, filed concurrently herewith, by M. J. Cochran et al, which is hereby incorporated by reference, so that the outputs from registers 638 on lines 622 actuate a segmented display such as a bank of VLED's arranged in a similar sequence of 5 × 7 "dots." The addressing of the VLED array via lines 622 and the one-out-of-five decode 639 is as above described. However, the output from the one-out-of-seven decodes 644 on lines 619a is coupled to a counter 650 as shown in FIG. 8a via lines 619b. As will be explained, seven bit counter 650 circulates a single bit through the seven positions for actuating each row of the seven row matrix in sequence, in a manner analogous to vertical displacement of the paper by the paper drive motor 619.

Referring now to FIG. 8a, there is shown a functional representation of the VLED display matrix and counter 650 utilized in combination with the driver chip 23 for displaying the alphanumeric prompting commands according to this invention. Twenty groups of 5 × 7 diode arrays are arranged having the respectively positioned diode in each row electrically connected in common. That is, line A1 connects the first dot in the first row of each array, line A2 connects the second dot in each 5 × 7 group and so forth. Lines B1-B7 electrically couple each row of each diode matrix with the like row of the grouping, i.e., line B1 connects the first row of each matrix while B2 connects the second row and so forth. It is understood that lines B1-B7 need not originate from counter 650 as shown, but may be shown serially connecting the diode rows.

Counter 650 is a 7-bit counter wherein a logic zero is shifted one bit at a time so as to effect strobing of the 7 rows of the diode matrices. All B1 lines are actuated for one D time, for example, while all B2 lines are actuated during the succeeding D time, and so forth. Line 619b from the printer chip is understood to be the analogous connection to the printer/delay chip 618 in FIG. 7, as line 619a couple to the paper drive motor 619. In the above described manner, it is seen that functioning of the VLED display is analogous to that earlier described with respect to the printer output. Appropriate diodes are actuated in each row, and then the next succeeding row is actuated until the entire 7 rows are scanned, with the scanning rate at a sufficiently high rate such that the eye sees a continuous scan to effect a complete alphanumeric character. That is, referring to FIG. 8b, it is seen that the IO-I15 digits have a 11110 code for the A1 dot. This means that to generate the word "ENTER" as shown in FIG. 8a, then the two tables shown in FIG. 8b will be utilized to energize the first two rows of diodes in the matrices.

Fabrication of light emitting diode displays is now well known in the art and interconnection thereof in the manner above descirbed is readily accomplished. Counter 650 is a conventional seven stage shift register.

The counter 650 in combination with the register 638 in FIG. 7 for driving the diode matrix display is such that a moving message may be generated on the diode display. That is, by shifting the contents in the SAM 631 and accordingly in the output register 638 in FIG. 7 one bit at a time at the appropriate rate and shifting in a new data bit to be displayed and energizing the appropriate diodes accordingly, then a moving or flowing display is generated. This, of course, advantageously allows more than a 20 digit prompting command to be displayed on the display. A typical frequency for actuating the diode matrices and shifting the register 638 is 30 Hertz.

TIMING

Referring now to FIG. 9a, there is shown the timing relationship between the clocks $\phi 1$ and $\phi 2$ provided by the clock chip 21 and between the internally generated clocks P1 and P2.

The frequency used is 250 KHz for $\phi 1$, $\phi 2$ at the fast rate and 40 KHz at the slow rate. The clock generators may be conventional and are not shown herein.

One set of clocks $\phi 1 P1 \phi 2 P2$ is referred to as a state time, and represents the time for one bit from each of the main registers A, B, C and D to be operated on in parallel by the ALU, etc. The BCD arithmetic used in the arithmetic chip requires one full set of clock pulses for each digit, so 16 sets or state times are needed to perform arithmetic operations on all sixteen digits in a register. Sixteen state times represent one D time or instruction cycle, as seen in FIG. 9b.

Individual address lines in the SAM registers are energized only for three of the clocks $\phi 1$, P1, $\phi 2$, rather than all four; these groups of three are also referred to as state times $S_0$–$S_{15}$ as seen in FIG. 9a. The same state times generated to operate the address lines of the SAM register also operate or time the remainder of the system.

D times generated directly from state times $S_0$–$S_{15}$ are used to scan the keyboard. As seen in FIG. 9b, the D times count down, D15, D14, D13 . . . D0 while the state times count up, S0, S1, S2 . . . S15. This feature aids in zero suppression technique since leading zeros to be suppressed are on the left or MSD first while the ALU must operate from right to left or LSD first.

THE KEYBOARD INPUT MATRIX

Figure 10:
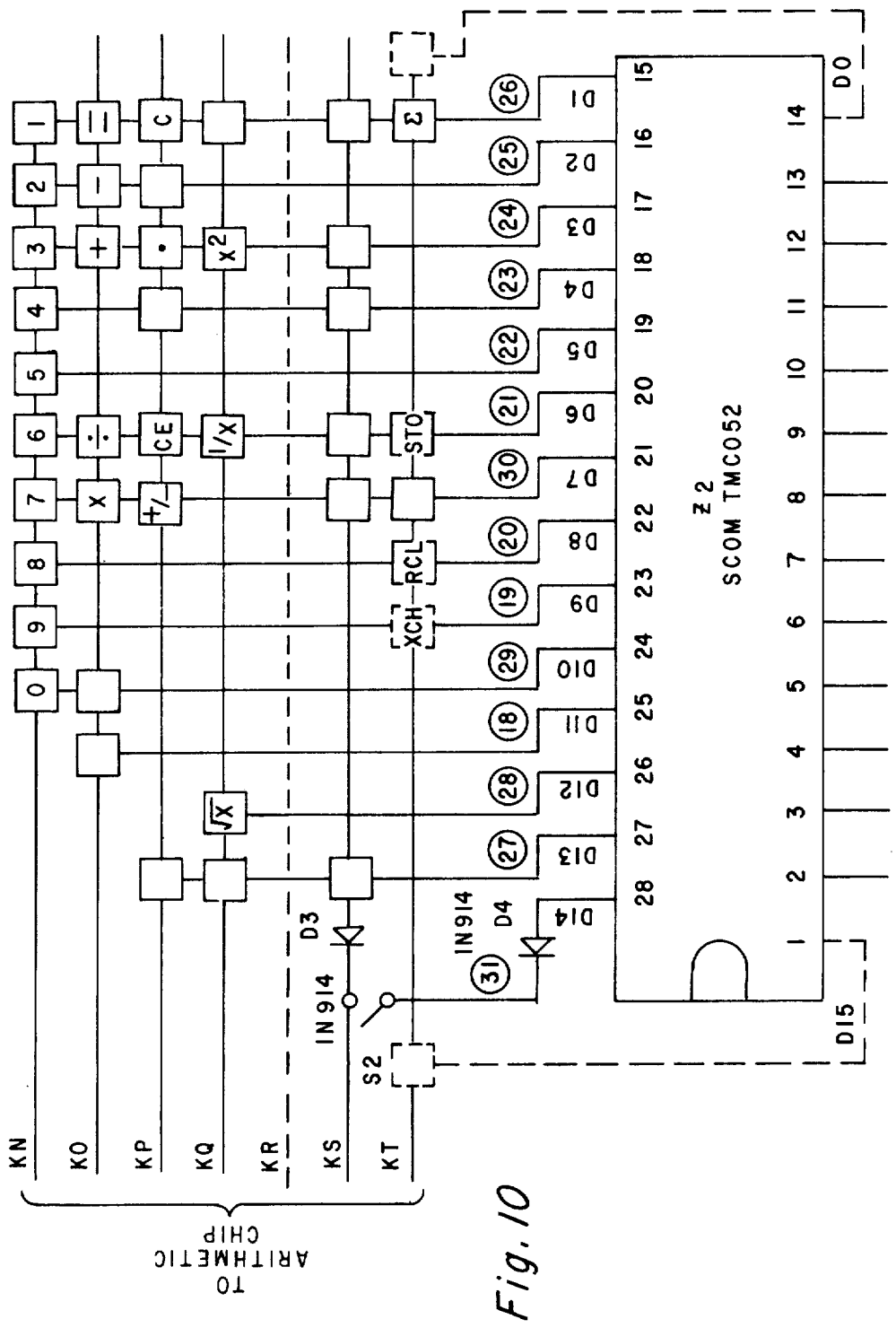
FIG. 10 depicts an exemplary keyboard input matrix typically utilized in the system of FIG. 2.

In FIG. 10, there is seen a sixteen by seven matrix showing the keys from the keyboard arranged as scanned by the sixteen digit timing signals $D_0$–$D_{15}$, and as sensed on the seven outputs at KN-KT, from which keyboard information is entered into the system. If a "1" voltage appears on line KP at $D_{13}$ time, then the EE key is depressed, etc. The combination of a digit time and a sense line identifies a key, and these sixteen and seven line items are binary encoded within the machine to appear as 4 and 3 bits respectively. The keyboard and digit time information is loaded into the keyboard register 54 for subsequent addressing for the ROM or for execution by the ALU. The various unlabelled blocks at crosspoints in the matrix are understood to be locations representing such functions on the keyboard 2 in FIG. 1 as Paper Advance (PA), YES, NO. Depreciation, etc.

INSTRUCTION/ADDRESS/CONTROL WORD FORMAT

Figure 11A:
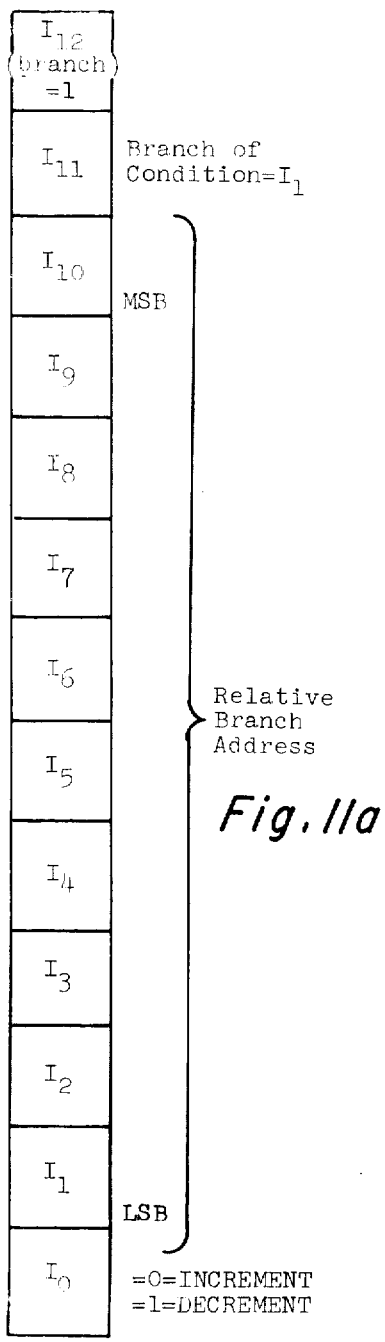
Figure 11B:
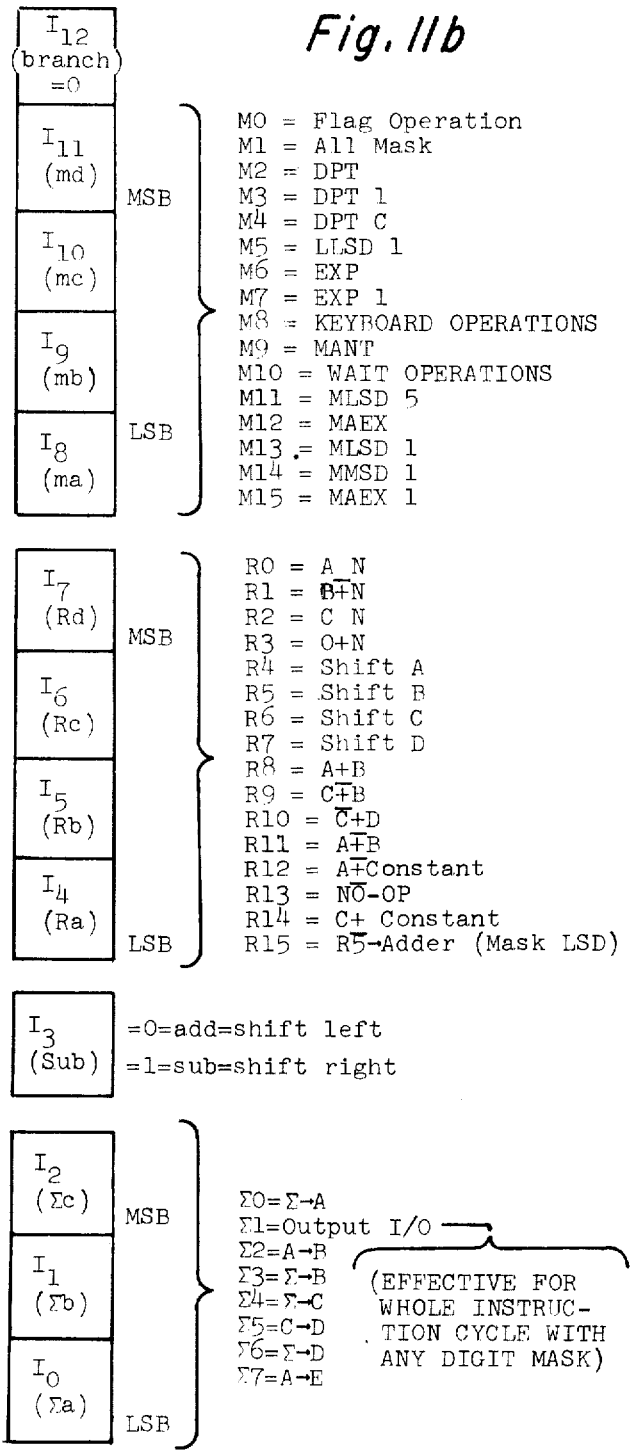

Shown in FIGS. 11a –11f is one chosen format for representing the instruction word $I_0$–$I_{12}$ and its decoded meaning. FIG. 11a denotes the thirteen bit instruction word $I_0$–$I_{12}$ as it appears in the instruction register 26 on the SCOM chip after it has been read out of the ROM 20. The formats for operations on branches (or increments) are different as seen in FIGS. 11a and 11b. The $I_{12}$ bit is shown containing a 1 indicating that the instruction word is either an increment or a conditional branch command and not an instruction. That is, if bit $I_{11}$, the COND bit, matches the COND bit of external communicated from the arithmetic chip at time $S_1$, then bits $I_1$–$I_{10}$ of FIG. 11a represent a relative branch address. That is, bits $I_1$–$I_{10}$ represent an incremental number which is to be added or subtracted from the previous ROM location as commanded by the $I_0$ bit in FIG. 11a to generate a new address as shown in FIG. 11a. If the $I_0$ bit is a zero, then the relative branch address in bits $I_1$–$I_{10}$ is to be added to the old address. If $I_0$ is a 1, then the relative branch address is to be subtracted from the old address.

If the $I_{12}$ bit of the instructions word in the instruction register 26 is a zero, then bits $I_0$–$I_{11}$ represent an instruction which is decoded locally on the arithmetic chip and in the decode PLA 28 on the SCOM chip. For example, bits $I_8$–$I_{12}$ are decoded in the digit mask PLA 83 to provide the M or masking operations defined for an M field of $M_0$–$M_{15}$ and to provide a constant N. Bits $I_4$–$I_7$ are decoded by the R decode PLA 73 to provide the register or R operation indicated. Bits $I_4$–$I_7$ are also decoded in the D/S flag test and mask comparator 68 for providing FMSK as shown in FIG. 11c. Bits $I_0$–$I_2$ are decoded in the sigma decoder 74 for controlling register select while the $I_3$ bit actuates the logic and encoder 77 for indicating add or subtract. In FIG. 11c, the $I_0$–$I_3$ bits are decoded by the flag decode PLA 72 for generating the F or flag commands for controlling the flag registers. Decode PLA 28 decodes the instruction word for providing store and recall of the F and G registers.

Bits $I_0$–$I_7$ also actuate the K comparator 78 for determining which K line of the keyboard has been actuated upon a key depression. In FIG. 11e, bits $I_0$–$I_3$, which are decoded in the flag decode PLA 72, also generate the wait or W instructions for placing the calculator in a non-operational or waiting condition until a specified condition such as the arrival of a specific D time encoded in bits $I_4$–$I_7$. Bits $I_4$–$I_7$ are decoded in the flag mask comparator 68 for generating the condition whose occurrence controls wait.

In FIG. 11f, the external command EXT is generated from the data chip in performing a P Reg or constant ROM recall or addressing of the printer/display chips. In bits $S_0$, the P Reg command with a 1 therein represents the condition that the arithmetic chip is desiring to jam in a specific address into the ROM for causing an unconditional jump, such as at power up clear. A zero in bit $S_0$ represents the conditions that the arithmetic chip may be either addressing the constant ROM, executing a conditional branch or merely communicating COND and HOLD signals. The P Reg jam-in circuitry is inactivated during constant recall allowing the ROM to increment normally. The second bit, occurring at time $S_1$, is the COND bit for communicating to the SCOM chip the status of the condition latch, indicating that a conditional event has occurred to which the ROM should respond. The COND bit at time $S_1$ controls whether or not a conditional branch is executed as determined by the most recent instruction word from the ROM. That is, if the $S_1$ bit of external matches bit $I_{11}$ of the branch instruction, then the ROM will be incremented by the relative branch address as earlier discussed.

The third bit of external, occurring at time $S_2$, is the HOLD command indicating that the SCOM is to inhibit the incrementing of the ROM and "HOLD" the ROM instruction word for a specified period. The HOLD bit is responsive, for example, to the "WAIT" generator 69.

Bits $S_3$–$S_{15}$ are always specific absolute addresses. If the $S_0$ bit is a "1", then the $S_3$–$S_{15}$ bits represent a specific address in the ROM to which it is to branch. If the $S_0$ bit is a zero, then the $S_3$–$S_{15}$ address may be that of a constant location in the constant ROM 35 for doing a "recall constant" or a conditional branch to the specific main ROM location. Upon a "recall constant instruction", as decoded from the decode PLA 28, then the preceeding EXT communication with a zero at time $S_0$ will recall the specific constant. Bits $S_3$–$S_9$ are also utilized in addressing the printer/display chips 22, 23. That is, upon a proper instruction word such as "Print" or "Display" (not shown in FIGS. 11) by way of the IRG line, then the display/printer chip knows that the subsequent data in the $S_3$–$S_9$ bits on EXT is a decoded character of function representation which is to be printed/displayed. Six bits are required to send a character print/display while seven are utilized to send a function print. These codes are, of course, correlated with the characters stored in the ROM 632 and any suitable format may be chosen.

Depicted in FIG. 11g is the coding format for the ROM address word as stored in the address register 23 on the SCOM chip. As the 1,024 13-bit instruction words are stored in the ROM 20 in a 64 × 16 × 13 bit array, bits $A_0$–$A_6$ address the 8 columns per row for selecting the proper column addressed. Bits $A_{10}$–$A_{12}$ represent chip select and are decoded so as to enable buffer 27 so as to control whether or not the instruction word from the ROM 20 is communicated to the arithmetic chip.

Figure 12A:
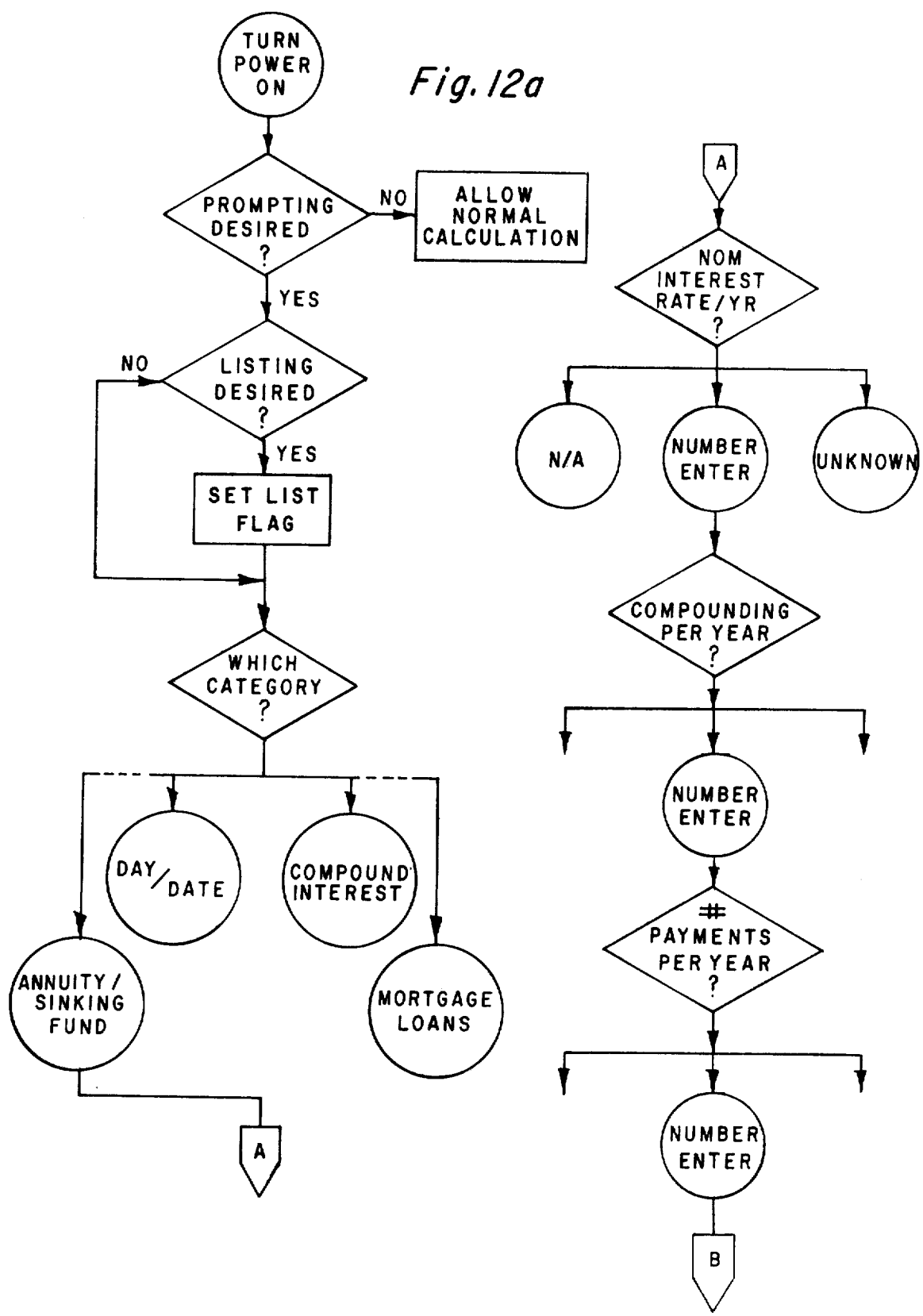
FIGS. 12a and 12b depict a flow diagram the system of this invention utilizes.
Figure 12B:
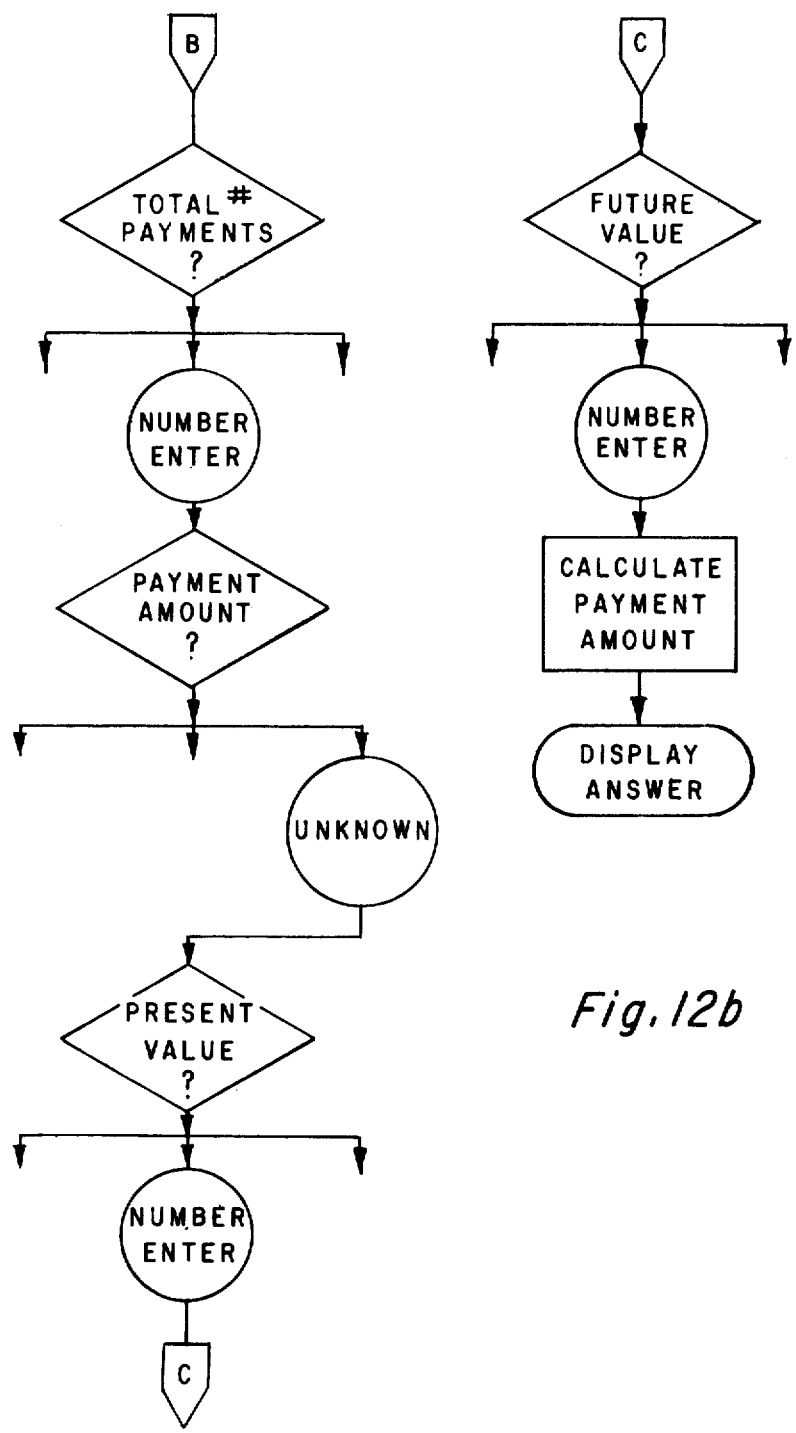

Having explained general operation above of each chip in general, there is shown in FIGS. 12a and 12b a typical flow diagram for solving the interest problem of Table I which the calculator executes during operations according to this invention. It is understood that it is well within the capability of one having ordinary skill in the art to program a ROM code to implement the following flow diagram. An exemplary ROM code programming the arithmetic and SCOM chips into a scientific calculator and the instruction word encoding thereof is found in the above referenced copending patent application Ser. No. 397,060, with FIGS. 11a-11f reproducing therefrom the decode of the instruction word and decode of EXT.

Referring now to FIGS. 12a and 12b, initially the power on the calculator is turned on, and the calculator executes a power up clear routine wherein the ROM 40 in the SCOM chip is formed to its location zero. Normally, specific keyboard inputs which are encoded as K line and D time information are loaded into the keyboard register 54 and a "PREG" command forces the ROM on the SCOM chip to the location determined by the contents of the keyboard register. However, during power up clear, a hardware technique is utilized to force the ROM to location zero.

The above mentioned keyboard register provides functions other than addressing the main ROM and the constant ROM in the SCOM chip. The keyboard register utilizes an instruction word which causes the contents of the keyboard register to be incremented by one, allowing it to function as a counter. If the number in the keyboard register represents an address of a constant in the constant ROM on the SCOM chip or of a character in chips 22, 23, then a succession of constants or characters may be provided during successive instruction cycles so that a subroutine may perform several iterations utilizing progressively smaller constants according to an arithmetic progression. That is, since the keyboard register recirculates and has an add-one circuit, information therein may also be incremented by one, thereby providing a method for addressing characters in sequence in the ROM 632 by doing a succession of appropriate instructions with the keyboard register incremented by one each time.

The second step in the sequence is the generation of the "prompting desired?" question to be flashed on the display. Several techniques have above been referred which may be utilized in effecting this display. For example, a series of instructions in the ROM 40 may be read out which cause the proper bits in the $S_3$–$S_9$ stages of the keyboard register to be set in accordance with the code in the ROM 632 so that a "p" will be printed. Then, a sequence is generated so that a code is set in the keyboard register representing an R and so forth.

Another method for effecting the question to be displayed/printed is to utilize four bits of the instruction word itself as four of the six or seven bits required to be set into the keyboard register for communication to the display chip. That is, referring again to FIG. 113, a NUM → R5 (put number (D) into R5) command causes entry of a segment of the instruction word into register 5, and then an R5 → KR command effects entry of those digits into the keyboard register.

Still another method for effecting display of the question is the storage of a particular question is the storage of a particular question or word into the constant register 35 on the SCOM chip, and then addressing the constant ROM 35 by way of an EXT address and then loading the address sequentially into R5 and then into the keyboard register.

After choosing one or a combination of the above described methods for implementing the question on the display, the sample flow chart is then effected in a straight forward and understandable manner. It is observed that the diamond shaped questions are effected by the calculator with a conditional branch instruction, and the rectangular boxes are effected by an unconditional instruction from the main ROM. It is seen that a tree-type technique is utilized wherein the calculator seeks all possible bits of information needed for the specific problem and calculates the "unknown" quantity after entry of all needed information.

It is thus seen that a data processing unit, preferable a calculator, has been provided which in response to a function input generates a sequence of visual indications to the user which relate to him the next input expected by the system. Option is provided for either a display or a printed output, and further the display may be strobed so as to effect continuously moving characters to increase capacity of the display.

While specific embodiments have been herein described in detail, modifications thereto will be apparent to those skilled in the art without departing from the spirit of the invention.

What is claimed is:

1. A calculator system comprising:
   a. a keyboard having numeric and function data entry keys and a plurality of response keys;
   b. storage means for storing data and instructions including both single function instructions and multi-function program sequences of instructions, said stored sequences of instructions including prompting messages which indicate specific information required by the respective multi-function program in order to proceed with execution of said respective multi-function program;
   c. control means for controlling the operation of said calculator on data in accordance with the program instructions stored in said storage means;
   d. an arithmetic/logic means for performing arithmetic and/or logic operations in response to the stored instructions under control of said control means;
   e. output display means for displaying alphanumeric data including said prompting messages;
   f. means selectively coupling said response keys to said control means for controlling said calculator to selectively proceed in the execution of a selected program sequence in one of a plurality of different preselected manners according to selective activation of said response keys in response to the display of said prompting messages; and
   g. means selectively coupling said data entry keys to said control means for controlling said calculator to selectively proceed in the execution a selected program sequence according to the data entered in response to the display of said prompting messages.

2. The calculator system according to claim 1 wherein said storage means includes a plurality of shift register memory means.

3. The calculator system according to claim 1 wherein said storage means includes a plurality of random access memory means.

4. The calculator system according to claim 1 wherein said response keys include a "yes" indicating key and a "no" indicating key for indicating to said control means whether or not to proceed in the manner suggested by a prompting message displayed by said output displayed means.

5. The calculator system according to claim 1 wherein said response keys include a "not applicable" indicating key for indicating to said control means to proceed in execution of a selected program sequence without a further response to a prompting message displayed by said output display means.

6. The calculator system according to claim 1 wherein said response keys include an "enter" indicating key for indicating to said control means that a complete set of data from said numeric data entry keys has been entered in response to a prompting message displayed by said output display means.

7. The calculator system according to claim 1 including logic means coupled to said output display means for decoding the prompting messages displayed by said output display means.

8. The calculator system according to claim 1 wherein said display means includes a plurality of light emitting diode display elements each having energizible light emitters arranged in a preselected pattern for displaying alpha and numeric characters.

9. The calculator system according to claim 1 wherein said display means includes a printing device for printing alpha and numeric characters on a printing medium.

10. The calculator system according to claim 1 including a plurality of selection keys in said keyboard for selecting one of the multi-function program sequences of instructions for execution.

* * * * *